United States Patent
Mori

(10) Patent No.: US 8,630,419 B2
(45) Date of Patent: Jan. 14, 2014

(54) APPARATUS AND METHOD FOR ENCRYPTING IMAGE DATA, AND DECRYPTING THE ENCRYPTED IMAGE DATA, AND IMAGE DATA DISTRIBUTION SYSTEM

(75) Inventor: Masaki Mori, Hyogo (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 192 days.

(21) Appl. No.: 13/059,018

(22) PCT Filed: Aug. 13, 2008

(86) PCT No.: PCT/JP2008/002213
§ 371 (c)(1),
(2), (4) Date: Jun. 1, 2011

(87) PCT Pub. No.: WO2010/018611
PCT Pub. Date: Jan. 18, 2010

(65) Prior Publication Data
US 2011/0222687 A1    Sep. 15, 2011

(51) Int. Cl.
*G06F 21/00*    (2013.01)
(52) U.S. Cl.
USPC ............... 380/277; 726/26; 726/28; 713/168; 713/193; 709/231; 380/37; 380/200; 380/278
(58) Field of Classification Search
USPC .................................. 380/200, 277
See application file for complete search history.

(56) References Cited

U.S. PATENT DOCUMENTS

| 6,477,252 B1 * | 11/2002 | Faber et al. .................... 380/200 |
| 7,797,536 B1 * | 9/2010 | Lyle .............................. 713/168 |
| 2001/0020981 A1 * | 9/2001 | Jun et al. ..................... 348/426.1 |
| 2003/0063745 A1 | 4/2003 | Boykin et al. |

(Continued)

FOREIGN PATENT DOCUMENTS

| EP | 0 926 897 A | 6/1999 |
| JP | 2002232412 A | 8/2002 |
| JP | 2004120141 A | 4/2004 |
| JP | 2004252966 A | 9/2004 |

OTHER PUBLICATIONS

Communication Pursuant to Article 94(3) EPC dated Jun. 15, 2012 in European Patent Application No. 08 808 245.8.

(Continued)

*Primary Examiner* — Morshed Mehedi
(74) *Attorney, Agent, or Firm* — Arent Fox LLP

(57) ABSTRACT

An apparatus (14-1, 50) for encrypting image data is disclosed, which includes: a processor (42) configured to divide encoded still image data or video data into a first element (a) and a second element (b); generate a first key (k1); generate a second key (k2) for at least every one image of the still image data or video data; encrypt a first portion (b1) of the second element (b) of the image using the first key (k1) and the second key (k2) corresponding to the at least one image; replace a second portion (b2) of the second element (b) of the at least one image other than the first portion (b1) with the second key (k2) corresponding to the image; and compose the first element (a) of the image, the encrypted first portion (b1') of the second element (b), and the second key (k2), for at least every one image to generate encrypted data. An apparatus (16-2, 17-2, 70) for decrypting which decrypts the encrypted data generated by the encryption apparatus is also disclosed.

16 Claims, 19 Drawing Sheets

IMAGE DATA DISTRIBUTION SYSTEM 10

(56) References Cited

U.S. PATENT DOCUMENTS

| | | | | |
|---|---|---|---|---|
| 2004/0202321 | A1* | 10/2004 | Graunke et al. | 380/37 |
| 2004/0264698 | A1* | 12/2004 | Oda | 380/269 |
| 2005/0050344 | A1* | 3/2005 | Hull et al. | 713/193 |
| 2008/0260161 | A1* | 10/2008 | Yokota et al. | 380/278 |
| 2009/0070583 | A1* | 3/2009 | von Mueller et al. | 713/168 |
| 2009/0165067 | A1* | 6/2009 | Bruckman et al. | 725/110 |

OTHER PUBLICATIONS

Alattar A.M. et al., "Evaluation of Selective Encryption Techniques for Secure Transmittion of MPEG-Compressed Bit-Streams," IEEE, May 30, 1999, vol. 4, pp. 340-343, Florida.

Kunkelmann, T., "A Scalable Security Architecture for Multimedia Communication Standards," IEEE, Jun. 3, 1997, pp. 660-661, Ottawa, Ont., Canada.

Wen, et al., "A Format-Compliant Configurable Encryption Framework for Access Control of Video," IEEE, Jun. 1, 2002, vol. 12, No. 6, New Jersey, USA.

Won, et al., "Scalable Protection and Access Control in Full Scalable Video Coding,"Digital Watermarking Lecture Notes in Computer Science,Jan. 1, 2006, vol. 4283, pp. 407-421,DE.

International Search Report and Written Opinion for PCT/JP2008/002213 dated May 11, 2009.

* cited by examiner

Fig. 10

| VALUE NAME | EXPLANATION | NMEMONIC | REFERENCE TABLE | No. of bits |
|---|---|---|---|---|
| DCT_DC_size_luminance* | CODE LENGTH SPECIFICATION OF DCT_DC_differential OF LUMINANCE SIGNAL | vlclbf* | B.12 | 2-9 |
| DCT_DC_size_chrominance* | CODE LENGTH SPECIFICATION OF DCT_DC_differential OF COLOR DIFFERENCE SIGNAL | vlclbf* | B.13 | 2-9 |
| DCT_DC_differential | DIFFERENCE VALUE BETWEEN DC ELEMENTS | uimsbf* | | 1-11 |
| First DCT coefficient | FIRST DCT COEFFICIENT (DC ELEMENT) | vlclbf* | B.14-16 | 2-24 |
| Subsequent DCT coefficient | SUBSEQUENT DCT COEFFICIENTS UP TO 63 | vlclbf* | B.14-16 | 3-24 |
| End of Block | END OF BLOCK (SUBSEQUENT DCT COEFFICIENT WILL BE 0) | vlclbf* | B.14-15 | 2 or 4 |

* DCT_DC_size_Luminance: LUMINANCE SIGNAL BLOCK
DCT_DC_size_chrominance: COLOR DIFFERENCE BLOCK vlclbf: Variable length code, left bit first
uimsbf: Unsigned integer, most significant bit first.

APPARATUS AND METHOD FOR ENCRYPTING IMAGE DATA, AND DECRYPTING THE ENCRYPTED IMAGE DATA, AND IMAGE DATA DISTRIBUTION SYSTEM

TECHNICAL FIELD

The present invention relates to an apparatus and a method for encrypting image data, an apparatus and a method for decrypting the encrypted image data, and an image data distribution system.

BACKGROUND ART

In systems for distributing still image data and video data through TV broadcasting or through networks, generally, a scrambling process is performed to the image data to allow people who satisfy predetermined conditions to access the image data.

For example, there exists a method in which a distributing side performs a scrambling process for a partial exchange of the image data to be distributed and then an encoding process, and distributes the image data, while a receiving side performs a decoding process first, and then a descrambling process to the partially exchanged image to display the reconstructed image data.

There exists another method for displaying reconstructed image data in which a distributing side performs an encoding process first, and then scrambling process to image data to be distributed, while a receiving side performs a descrambling process first, and then a decoding process to the scrambled and encoded data.

Such a scrambling process is effective to restrict access to image data or the like, and any fraudulent use of the data can be prevented by issuing a key for a descrambling process only to the authorized users who are permitted to use the data.
Patent Citation 1: U.S. Pat. No. 6,246,777

DISCLOSURE OF INVENTION

Technical Problem

For example, in scrambling video data, when a scrambling process is performed to a number of images in the video data with one key, the same key is repeatedly used. In this case, there is a problem of vulnerability to known plaintext attacks.

Also, the video data is not distinguishable at all after such a scrambling process which is generally performed to the entire images.

The present invention addresses the above described problem by providing a novel and effective apparatus and method for encrypting image data, an apparatus and method for decrypting encrypted image data, and an image data distribution system. One specific object of the present invention is to provide an apparatus and method for encrypting image data, an apparatus and method for decrypting encrypted image data, and an image data distribution system, each of which having a higher security level and also easier handling.

Technical Solution

According to a first aspect of the present invention, an encryption apparatus is provided which includes: a processor configured to divide encoded still image data or video data into a first element and a second element; generate a first key; generate a second key for at least every one image of the still image data or video data; encrypt a first portion of the second element of the image using the first key and the second key corresponding to the at least one image; replace a second portion of the second element of the at least one image other than the first portion with the second key corresponding to the image; and compose the first element of the image, the encrypted first portion of the second element, and the second key, for at least every one image to generate encrypted data.

According to the present invention, in addition to a first key, a second key generated for at least every image of still image data or video data is used for encryption of the image data, which achieves a higher security level. Also, a first portion of a second element of at least every image of the encrypted data, that is a part of the image is encrypted, while a first element of the image is no encrypted, thereby a decoding of the encrypted data without decrypting allows the content of the image to be distinguishable, which enables editions of the encrypted data. Since the second key is embedded in the second portion of the second element of at least every image of the encrypted data, authorized users, that is those who have the first key and a device to take out the second key can decrypt not only at the start point of the encrypted data but also in the middle point of the data. Therefore, encrypted encoded still image data or video data having a higher security level and also easier handling is generated.

In the above invention, the second element may have a frequency higher than that of the first element, and the encoded still image data or video data is the one obtained by performing linear transformation and quantization to still image data or video data before encoding, and is a group of a predetermined bit number of data, in which the second element is comprised of lower bits than those of the first element. This makes the decoded image without decryption more distinguishable in a half-visible state.

Hereinafter and within the scope of the claim, MPEG standard includes MPEG-1, MPEG-2, MPEG-4, and MPEG4/AVC. The present invention can be applied to any standards for compressing video images by splitting an image into blocks and performing linear transformation for every block, including H.261, H.262, H.263, H.264, VC-1, Canopus HQ Codec, DV CODEC, Motion JPEG, and Motion JPEG 2000.

Moreover, hereinafter, and within the scope of the claim, a group of one or more images including at least one intra encoded image will be referred to GOP. JPEG standard unit JPEG and JPEG 2000. The present invention can be applied to any standards for compressing images using linear transformation for every block, including HD PHOTO.

According to a further aspect of the present invention, an encryption apparatus is provided which includes: a divider for dividing encoded still image data or video data into a first element and a second element; a first generator for generating a first key; a second generator for generating a second key for at least every one image of the still image data or video data; an encryptor for encrypting a first portion of the second element of the image using the first key and the second key corresponding to the at least one image; an composer for replacing a second portion of the second element of the at least one image other than the first portion with the second key corresponding to the image; and for composing the first element of the image, the encrypted first portion of the second element and the second key for at least every one image to generate an encrypted data.

According to the present invention, the similar effect to the invention of the above described encryption apparatus can be obtained.

According to a still further aspect of the present invention, a decryption apparatus for decrypting data encrypted by the above described encryption apparatus is provided, the apparatus including a processor configured to: divide each of the encrypted data into a first element and a second element; receive a first key; obtain a second key corresponding to at least one image from the second portion of the second element; decrypt the first portion of the second element using the first key and the second key; and compose the first element and the second element after the decryption.

According to the present invention, a second key is obtained from a second portion of a second element of an image, and the original of the image can be reconstructed from the corresponding portion of the still image data or video data.

According to a still further aspect of the present invention, an decryption apparatus for decrypting the data encrypted by the above described encryption apparatus is provided, the apparatus including: a divider for dividing each of the encrypted data into a first element and a second element; a receiver for receiving a first key; a decryptor for obtaining a second key corresponding to at least one image from the second portion of the second element and for decrypting the first portion of the second element using the first key and the second key; and a composer for composing the first element and the second element after the decryption.

According to the present invention, a second key is obtained from a second portion of a second element of an image, and the original of the image can be reconstructed from the corresponding portion of the still image data or video data.

According to a still further aspect of the present invention, an encryption method is provided, including: the steps of dividing encoded still image data or video data into a first element and a second element; generating a first key; generating a second key for at least every one image of the still image data or video data; encrypting a first portion of a second element of the image with the first key and the second key for at least every one image; replacing a second portion of the second element of the at least one image other than the first portion with the second key corresponding to the image; and generating encrypted data by composing the first element, the encrypted first portion of the second element, and the second key of the image for at least every one image.

According to the present invention, the similar effect to the invention of the above described encryption apparatus can be obtained.

According to a still further aspect of the present invention, a decrypting method for decrypting data encrypted by the above described encryption method is provided, the method including: the steps of dividing each of the encrypted data into a first element and a second element; receiving a first key; a step for obtaining a second key corresponding to at least one image from the second portion of the second element; decrypting the first portion of the second element using the first key and the second key; and composing the first element and the second element after the decryption.

According to the present invention, the similar effect to the invention of the above described decryption apparatus can be obtained.

According to a still further aspect of the present invention, an image data distribution system including an image data distributing apparatus and an image data receiving apparatus is provided: the image data distributing apparatus dividing encoded still image data or video data into a first element and a second element, encrypting the first portion of the second element with a first key and a second key corresponding to at least one image, replacing the second portion of the second element of the at least one image other than the first portion with a second key corresponding to the image, and composing the first element, the encrypted first portion of the second element, and the second key of the image for at least every one image; the image data receiving apparatus receiving the encrypted data distributed by the data distributing apparatus, dividing each of the encrypted data into a first element and a second element, obtaining a second key corresponding to at least one image from the second portion of the second element, decrypting the first portion of the second element using the first key and the second key, and composing the first element and the second element after the decryption.

According to the present invention, the distributed data can be maintained at a high security level.

Advantageous Effects

According to the present invention, an apparatus and method for encrypting image data, an apparatus and method for decrypting encrypted image data, and an image data distribution system, each of which having a higher security level and also easier handling, can be provided.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

FIG. 10 is a diagram illustrating a structure of a block layer in MPEG-2.

BEST MODE FOR CARRYING OUT THE INVENTION

Now, embodiments according to the present invention will be explained below with reference to the drawings.

First Embodiment

According to the first embodiment of the present invention, an image data distribution system is for example a system that transmits video images from a plurality of sets for image pickup or the like through a network as encoded image data, stores and controls the data at a server, and distributes a video image content which can be viewed and accessed at a plurality of terminals in real time or in a VOD (Video on Demand) in response to demands from the terminals. A specific example of the image data distribution system includes the one that enables a video image captured in an operation room of a hospital to be accessed in another room, and also allows a recorded image to be examined later in a VOD. Such an image data distribution system is not limited to the one used in hospitals, and may be used in various forms in library, museum, and event site such as exhibition, for example.

The video image content used in the image data distribution system is subjected to an encryption process for protection of privacy and copyright thereof, and also includes a content which is recognizable to some degree.

Figure 1:
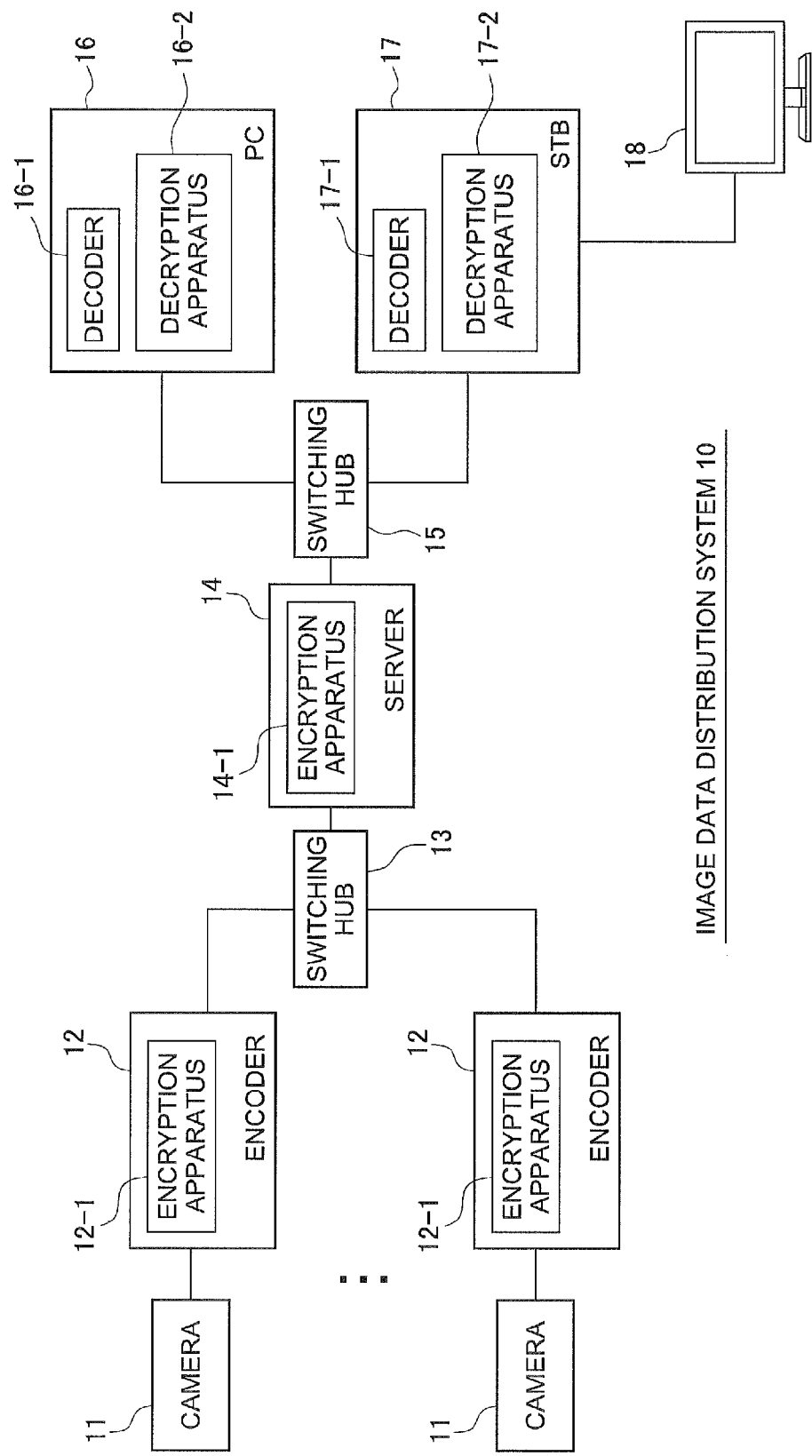
FIG. 1 is a diagram illustrating an image data distribution system according to a first embodiment of the present invention.

FIG. 1 is a diagram illustrating an image data distribution system according to a first embodiment of the present invention. To this image data distribution system, an encryption apparatus for generating encrypted data of the video image content, and a decryption apparatus for decrypting the data are applied.

Referring to FIG. 1, an image data distribution system 10 includes a camera 11, encoders 12, a switching hub 13, a server 14, a switching hub 15, a personal computer 16, a set top box 17, and a display 18.

The camera 11 and the encoders 12 for transforming the video image to encoded data are installed in one or a plurality of sets for image pickup. The camera 11 is installed at a site such as an operation room of a hospital where recording of a moving image is necessary.

The encoders 12 are individually connected to the server 14 via the switching hub 13. The encoders 12 encode image data from the camera 11 using a predetermined format: in the case of a still image data, the encoders 12 transform the image data into encoded data according to JPEG (Joint Photographic Experts Group) standard for example, and in the case of a video data, transform the image data into encoded data according to MPEG (Moving Picture Experts Group) standard for example.

The camera 11 and the encoders 12 may be installed in a plurality of sets, and even when a plurality of images are picked up simultaneously, each of the image data can be transmitted to the server 14 for storage.

The server 14 stores the image data transmitted from the encoders 12, and distributes the image data as needed to a terminal connected thereto.

The server 14 is configured to include an encryption apparatus 14-1 of the present invention which will be explained later, so that the server 14 causes the encryption apparatus 14-1 to encrypt the image data and to distribute the image data to a terminal as needed.

A terminal connected to the server 14 is configured with a display 18 and the like which is connected thereto via the personal computer 16 or the set top box 17, and is connected to the server 14 via the switching hub 15.

The image data stored in the server 14 can be viewed and accessed at the terminal connected to the server, and can be displayed on a video image display in real time, or displayed on a video image display in video-on-demand system.

The personal computer 16, the set top box 17, and the display 18 may be configured to be installed at one place or a plurality of places, and in the above case of hospital, these may be positioned in an examination room and/or other rooms of the hospital.

The personal computer 16 and the set top box 17 include decoders 16-1 and 17-1, respectively, for a decoding process which corresponds to the encoding process of the encoders 12, and also include decryption apparatuses 16-2 and 17-2 for decryption of image data which is generated and encrypted by the encryption apparatus 14-1 of the server 14 or the encryption apparatus 12-1 of the encoders 12, respectively. The decryption apparatuses 16-2, 17-2 decrypt the encrypted image data from the server 14 using an authorized encryption key. The personal computer 16 and the set top box 17 process and display the image data after the decryption by the decoders 16-1 and 17-1 and the decryption apparatus 16-2, 17-2.

Alternatively, the image data encoded by the encoder 12 may be directly received by the personal computer 16 or the set top box 17 so that the image data can be viewed and accessed in real time.

The encoder 12 may be configured to include the encryption apparatus 12-1 of the present invention, which will be explained later, so that the image data captured by the camera 11 can be transmitted to the server 14 after encryption. Hereinafter, for convenience of explanation, unless otherwise specified, the server 14 includes the encryption apparatus 14-1, and the encoder 12 does not include the encryption apparatus 12-1.

Figure 2:
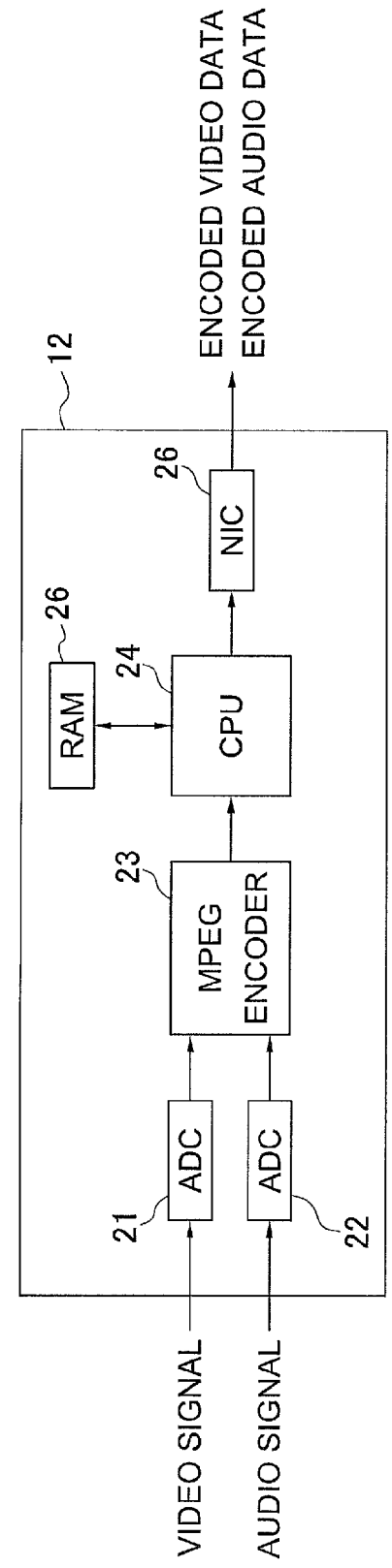
FIG. 2 is a block diagram showing an encoder.

FIG. 2 is a block diagram showing a hardware configuration of the encoder 12.

Referring to FIG. 2, the encoder 12 includes: an ADC 21 for transformation of an analog video signal from the camera 11 into digital video data; an ADC 22 for transformation of a audio signal from the camera 11 into digital audio data; a MPEG encoder 23 for encoding of the video data and the audio data according to MPEG standard and outputting the coded video data and the coded audio data; a CPU 24 for control of each component of the encoder 12 and for transmission of the encoded video data and the encoded audio data from the MPEG encoder 23 via an NIC (Network Interface Card) 26; and a RAM 25 for temporal storage of the data. When the camera 11 is a digital video camera, the ADC 21 and the ADC 22 may not be used, or may be eliminated. Furthermore, when the camera 11 outputs encoded video data and encoded audio data according to MPEG standard, the ADCs and the MPEG encoder 23 may not be used, or may be eliminated.

A hardware configuration with the CPU 24 and the RAM 26 as main components may be configured with software to function as an encryption apparatus as a result of cooperation with each other.

Figure 3:
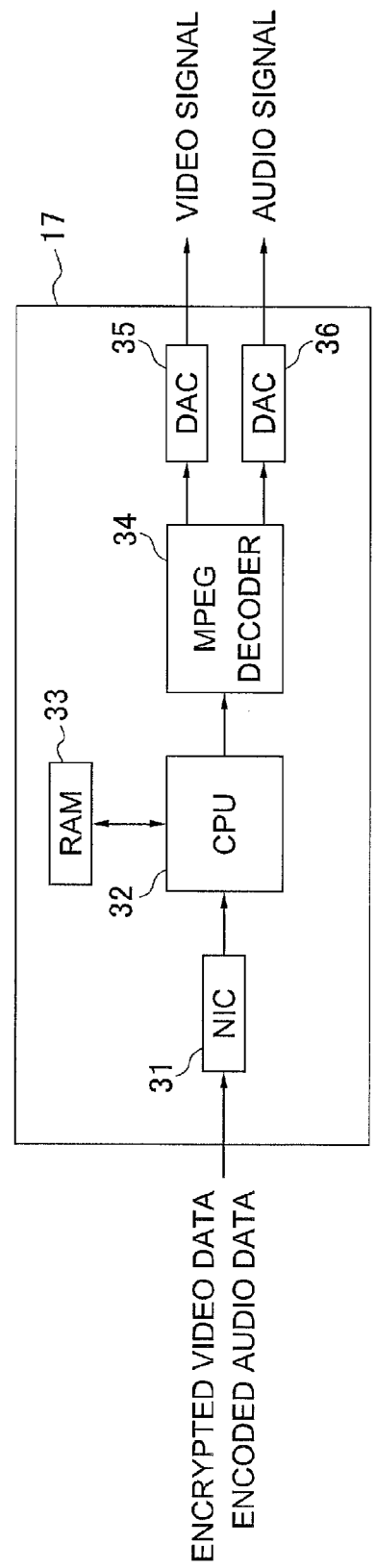
FIG. 3 is a block diagram showing a set top box.

FIG. 3 is a block diagram showing a hardware configuration of the set top box 17.

Referring to FIG. 3, the set top box 17 includes: a CPU 32 for receiving the encrypted video data and encoded audio data from the server 14 via an NIC (Network Interface Card) 31, and decrypting the encrypted video data; a RAM 33 for temporarily storing the data; a MPEG decoder 34 for decoding the encoded video data received at the CPU 32 and the encryption of which was decrypted; a DAC 35 for transforming the decoded video data into analog video signal for output; and a DAC 36 for transforming the decoded audio data into analog audio signal for output. When the data is output to the display which corresponds to digital signals, the DAC 35 and the DAC 36 may be eliminated.

A hardware configuration with the CPU 32 and the RAM 33 as main components also functions as a decryption apparatus for a decryption process, which will be explained later, as a result of cooperation with software.

Figure 4:
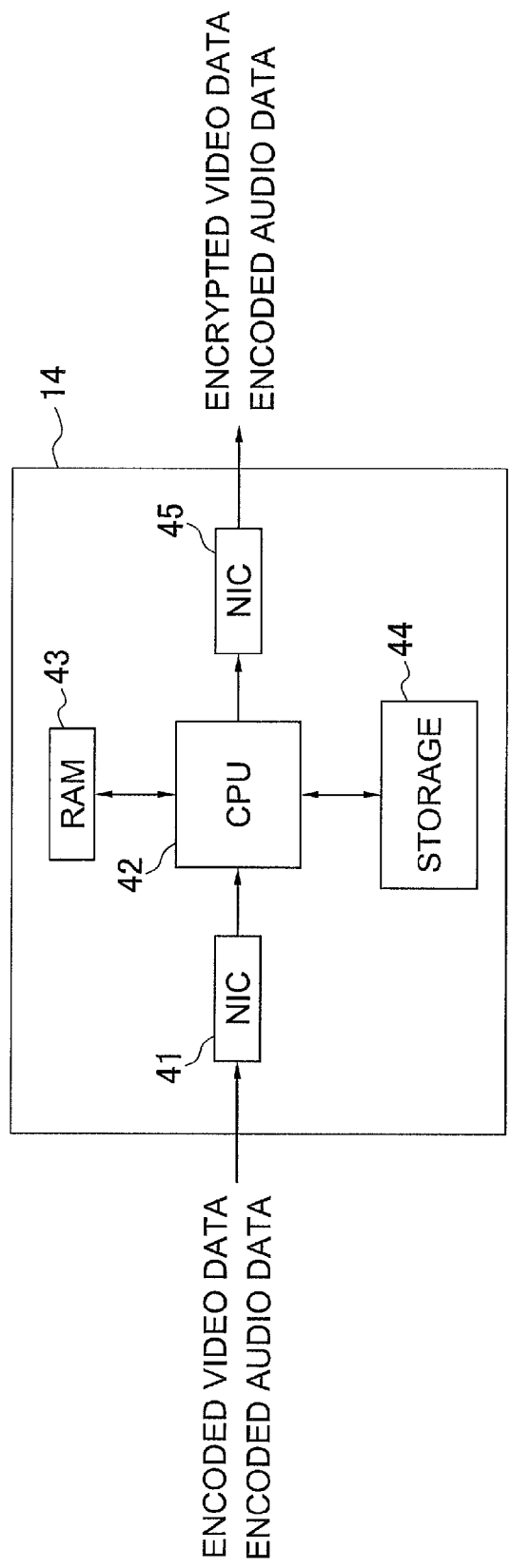
FIG. 4 is a block diagram showing a server.

FIG. 4 is a block diagram showing a hardware configuration of the server 14.

Referring to FIG. 4, the server 14 includes: a CPU 42 receiving the encoded video data and encoded audio data from the encoder 12 via an NIC 41, encrypting the encoded video data, and transmitting the encrypted video data and encoded audio data via an NIC 45 to a terminal side such as the personal computer 16 or the set top box 17; a RAM 43 for temporarily storing the data; and a storage 44 for storing the encoded video data and encoded audio data which was received at the CPU 42.

A hardware configuration with the CPU 42 and the RAM 43 as main components also functions as an encryption processing apparatus for carrying out an encryption process, which will be explained later, as a result of cooperation with software.

Only one of the NIC 41 and the NIC 45 may be used for transmission and receipt of data.

Next, an encryption apparatus according to the first embodiment of the present invention will be explained below. The encryption apparatus functions as being incorporated in the server 14 or the encoder 12 shown in FIG. 1 with the cooperation of the hardware and software with each other.

Figure 5:
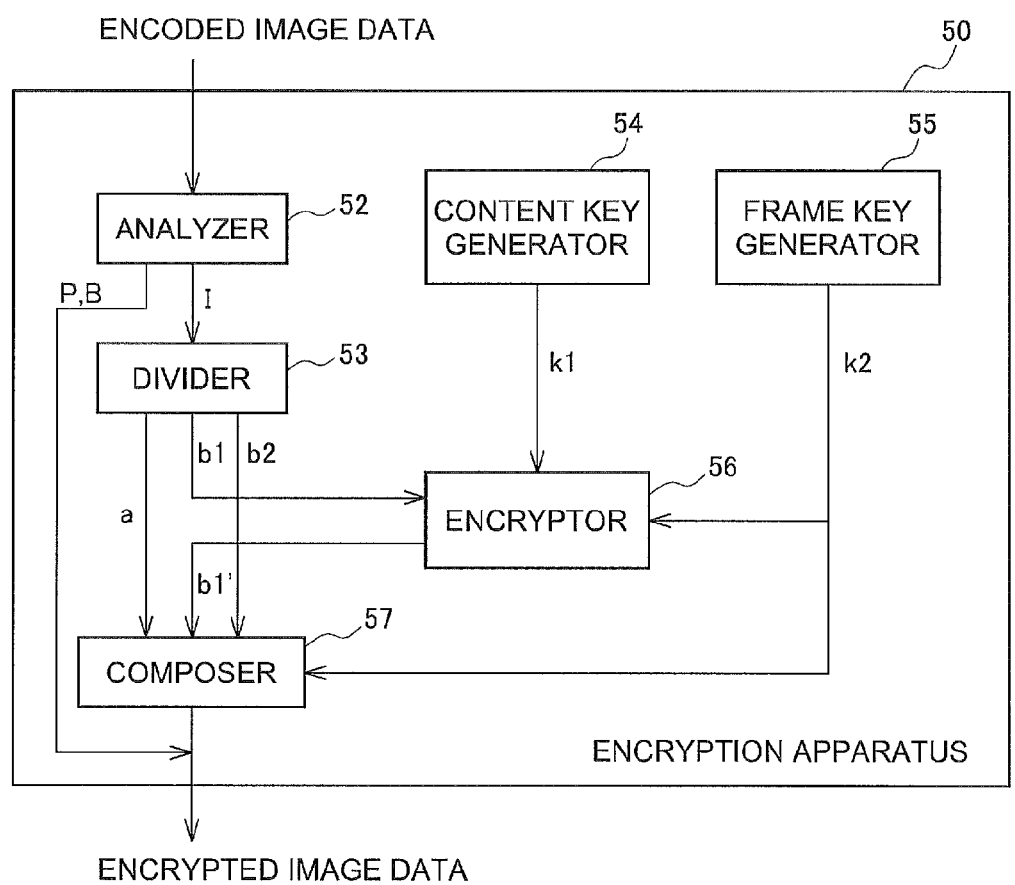
FIG. 5 is a functional block diagram showing an encryption apparatus according to the first embodiment.

FIG. 5 is a functional block diagram showing an encryption apparatus according to the first embodiment of the present invention.

Referring to FIG. 5, an encryption apparatus 50 includes an analyzer 52, a divider 53, a content key generator 54, a frame key generator 55, an encryptor 56, and a composer 57. The encryption apparatus 50 may not include the analyzer 52 when only static image is input as encoded image data.

The input data is image data encoded according to a predetermined format: still image data is encoded according to JPEG standard; and video data is encoded according to MPEG standard.

The analyzer 52 analyzes the input image data when the image data is encoded according to MPEG standards.

The video data encoded according to MPEG standard has a hierarchic structure including a sequence layer, a GOP (Group of Pictures) layer, a picture layer, a slice layer, a macro-block layer, and a block layer. The sequence layer is configured with a series of picture groups which have same attributes, and the GOP layer is configured with the minimum unit of picture groups as random access units. The GOP layer includes intraframe encoded images (Intra-Picture: I picture) which can be decoded independently from other pictures to reconstruct its image data, interframe forward directional prediction encoded images (Predictive-Picture: P picture), and bidirectional prediction encoded image (Bidirectionally Predictive-Picture: B picture). The slice layer contains information common to small pictures of any length into which one piece of picture is divided; the macro-block layer contains information common to pixel blocks into which the slice layer is further divided; and the block layer indicates a transformation coefficient itself.

The analyzer 52 analyzes image data to determine if the image data is I picture, P picture or B picture, using a sequence header in the sequence layer, a GOP header in the GOP layer, and a picture mode in the picture layer, and when the image data is I picture, the encoded data is sent to the divider 53. When the image data is P picture or B picture, the encoded image data is sent to the divider 53 as it is.

When only still image data is involved in as image data, the analyzer 52 may be eliminated.

The divider 53 divides encoded image data into a first element a and a second element b, and further divides the second element b into a first portion b1 and a second portion b2. For example, encoded image data may be divided, in frequency space in ascending order of frequency, into a first element a and a second element b, and the second element b may be further divided into first portion b1 and a second portion b2 in ascending order of frequency.

In the division, the second element b is configured with components having a frequency higher than that of the first element a, which are hard to visibly recognize in a displayed image. The second portion b2 of the second element b is configured with a number of components having a frequency higher than that of the first portion b 1, which are extremely hard to recognize. Preferably the second portion of the second element is configured with frequency components which are impossible to visibly recognize.

The content key generator 54 generates a first key (hereinafter, referred to as a content key) k1 which corresponds to a plurality of still image data or video data for one sequence, and for example, can be configured with a random number generator that generates a random number having a predetermined number of bits.

The frame key generator 55 generates a second key (hereinafter, referred to as a frame key) k2 which corresponds to each image of still image data or video data. Similar to the content key generator 54, the frame key generator 55 can be configured with a random number generator that generates a random number having a predetermined number of bits.

The encryptor 56 encrypts the first portion b1 of the second element which was divided by the divider 53, using the content key k1 generated by the content key generator 54 and the frame key k2 generated by the frame key generator 55. Specifically, the encryptor 56 uses the content key k1 and the frame key k2 to generate an encryption key for encryption, so that the encryptor 56 encrypts the first portion b1 of the second element using the encryption key. The algorithm used in the encryption may be stream cipher in which a key stream is generated to be used in an encryption in bits.

The stream cipher is an encryption algorithm, such as MUG1 and RC4, which achieves encryption for any length of bits using a small memory with small processing delay. The algorithms used in the encryption and the decryption may be configured in the same manner.

For example, the algorithm used in the decryption may be configured so that the content key k1 and the frame key k2 are used to irreversibly generate a random number sequence, and the random number sequence is used as a key stream to perform an XOR operation onto the first portion of the second element in bits so as to generate encrypted data.

Alternatively, the algorithm used in the encryption may be block cipher such as DES (Data Encryption Standard) or AES (Advanced Encryption Standard).

The block cipher is an algorithm to encrypt constant-length blocks of data, and includes Camellia, KASUMI, and MISTY, in addition to DES and AES, any of which can be used.

When the block cipher is DES, the algorithm can be configured for encryption with a 56-bit key length and a 64-bit block length; while the block cipher is AES, the algorithm can be configured for encryption with a 128-bit, 192-bit, or 256-bit key length, and a 128-bit block length.

The composer 57 discards the second portion b2 of the second element which was divided by the divider 53, and generates a frame key k2 to be replaced as a new second portion b2' of the second element, so as to compose the first element a which was divided by the divider 53, the first portion b 1' of the second element which was encrypted by the encryptor 56, and the second portion b2' of the second element which was replaced with the frame key k2. As described above, in the case of video data encoded according to MPEG standard, the data consists of a group of data blocks having 8×8 bits, and the composer 57 carries out a composite process by replacing the first element a, the encrypted first portion b1' of the second element, and the second portion b2' of the second element replaced with the frame key k2, which is generated in blocks, with a new data block having 8×8 bits.

Figure 6:
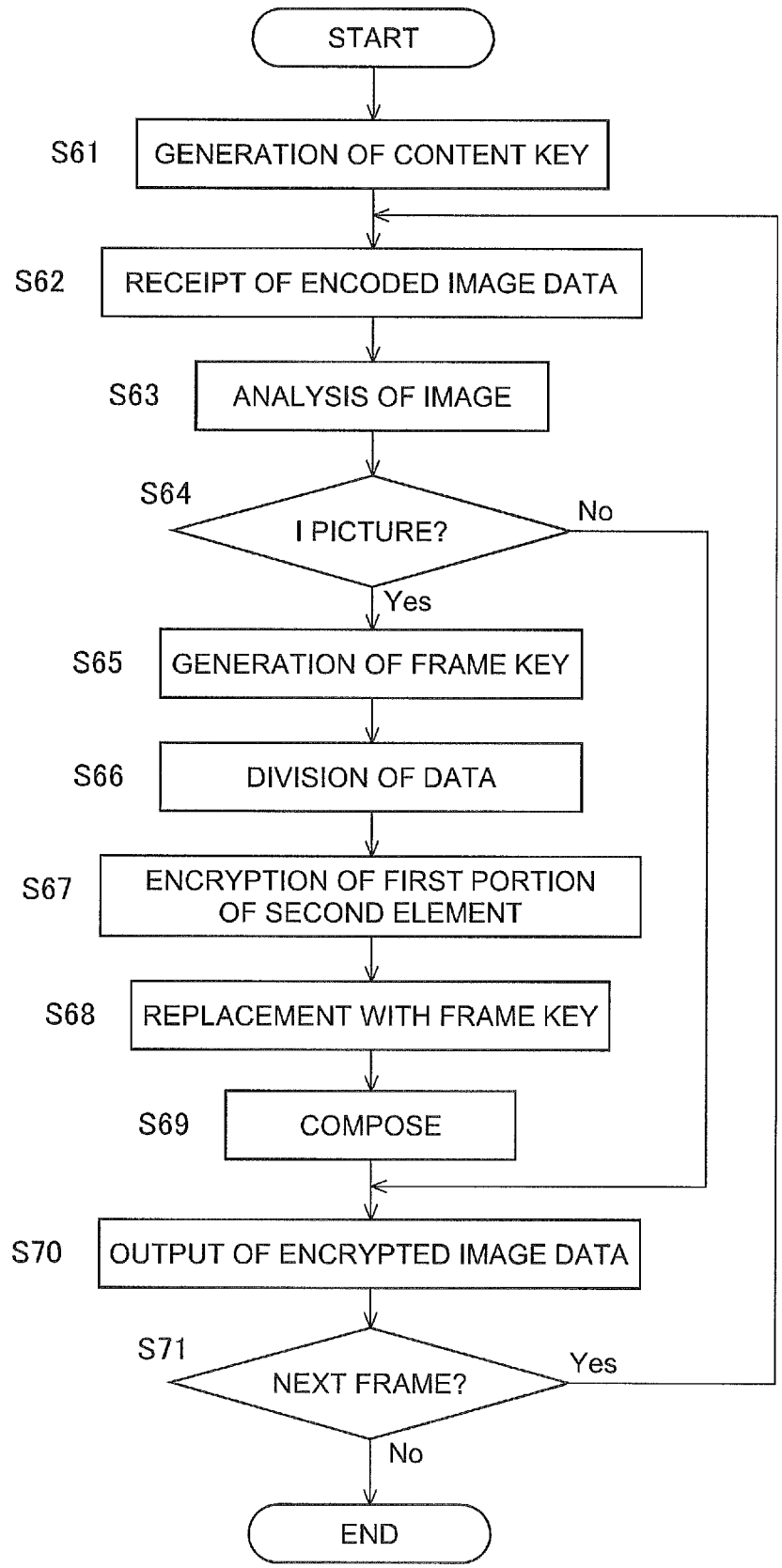
FIG. 6 is a flowchart showing an encryption method according to the first embodiment.

FIG. 6 is a flowchart showing an encryption process in the encryption apparatus 50.

Referring to FIG. 6, in Step S61, the content key generator 54 generates a content key k1. The content key k1 is generated corresponding to a plurality of still image data or video data comprising of one sequence, and can be generated, for example by a random number generator which generates a random number having a predetermined number of bits.

In Step S62, encoded image data is received. The input data is image data encoded according to a predetermined format: still image data is encoded according to JPEG standard; and video data is encoded according to MPEG standard.

In Step S63, the analyzer 52 analyzes the image data to determine if the image data is I picture, P picture or B picture, using a sequence header in the sequence layer, a GOP header in the GOP layer, and a picture mode in the picture layer, and when the image data is I picture, the encoded data is sent to the divider 53. When only still image data is involved in as the image data, Step S63 may be eliminated.

In Step S64, when the analyzer 52 determines that the image data is I picture, the process goes to Step S65, otherwise goes to Step S70.

In Step S65, the frame key generator 55 generates a frame key k2 which corresponds to the image. The frame key corresponds to every image of the still image data or video data, and similar to the content key, can be generated by a random number generator which generates a random number having a predetermined number of bits.

In Step S66, the divider 53 divides the encoded image data into a first element a, a first portion b1 of a second element, and a second portion b2 of the second element. In this case, the encoded image data is first divided into a first element a and a second element b, and the second element b is further divided into a first portion b1 and a second portion b2. For example, the encoded image data may be divided, in frequency space in ascending order of frequency, into a first element a and a second element b, and the second element b may be further divided into first portion b1 and a second portion b2 in ascending order of frequency.

In the division, the second element b is configured with components having a frequency higher than that of the first element a, which are hard to visibly recognize in a displayed image. The second portion b2 of the second element b is configured with a number of components having a frequency higher than that of the first portion b 1, which are extremely hard to recognize. Preferably the second portion of the second element is configured with frequency components which are impossible to visibly recognize.

In Step S67, the encryptor 56 encrypts the first portion b1 of the second element using the content key k1 and the frame key k2. Specifically, the encryptor 56 uses the content key k1 and the frame key k2 to generate an encryption key for encryption, so that the encryptor 56 encrypts the first portion b1 of the second element using the encryption key. The algorithm used in the encryption may be stream cipher in which a key stream is generated to be used in an encryption in bits.

The stream cipher is, as described above, an encryption algorithm, such as MUG1 and RC4, which achieves encryption for any length of bits using a small memory with small processing delay.

For example, the algorithm used in the decryption may be configured so that the content key k1 and the frame key k2 are used to irreversibly generate a random number sequence, and the random number sequence is used as a key stream to perform an XOR operation onto the first portion of the second element in bits so as to generate encrypted data.

Alternatively, the algorithm used in the encryption may be block cipher such as DES (Data Encryption Standard) or AES (Advanced Encryption Standard).

The block cipher is an algorithm to encrypt constant-length blocks of data, and includes Camellia, KASUMI, and MISTY, in addition to DES and AES, any of which can be used.

When the block cipher is DES, the algorithm can be configured for encryption with a 56-bit key length and a 64-bit block length; while the block cipher is AES, the algorithm can be configured for encryption with a 128-bit, 192-bit, or 256-bit key length, and a 128-bit block length.

In Step S68, the composer 57 discards the second portion b2 of the second element which was divided by the divider 53, and replaces with the frame key as a new second portion b2' of the second element.

In Step S69, the composer 57 composes the first element a which was divided by the divider 53, the first portion b 1' of the second element which was encrypted by the encryptor 56, and the second portion b2' of the second element which was replaced with the frame key k2.

In Step S70, the composer 57 outputs the composite data. The composer 57 discards the divided second portion b2 of the second element, and replaces with the frame key k2 as a new second portion b2' of the second element, so as to compose the first element a which was divided by the divider 53, the first portion b1' of the second element which was encrypted by the encryptor 56, and the second portion b2' of the second element which was replaced with the frame key k2. As described above, in the case of video data encoded according to MPEG standard, the data consists of a group of data blocks having 8×8 bits, and the composer 57 carries out a composite process by replacing the first element a, the encrypted first portion b 1' of the second element, and the second portion b2' of the second element replaced with the frame key k2, which is generated in blocks, with a new data block having 8×8 bits.

In Step S71, it is determined if there is any input data or not, and if there is any data, the process goes to Step S62, otherwise the process ends.

When only still image data is involved in as the encoded image data, Step S63 and Step S64 may be eliminated.

Among the encrypt image data generated in the encryption apparatus 50, the first element a that can be recognized as a normal image and the first portion b1 of the second element that cannot be recognized as a normal image due to the encryption are output. Therefore, a user can understand the outline of the image, but cannot recognize the detail of the image because of the encrypted first portion b1 of the second element.

In addition, since the second portion of the second element of the image data includes the frame key k2, a transmission of the content key k1 using another communication unit in advance eliminates the necessity of a separate transmission of an encryption key for each image, which allows the work to update the key to be omitted.

As for video data encoded according to MPEG standard, encrypted data which can be playbacked from any GOP can be generated when a frame key is generated for each GOP and a second portion of a second element of I picture is replaced with the frame key.

The second portion of a second element of image replaced with the frame key k2 is set to include frequency components which cannot be visibly recognized, so that the security level of the image can be enhanced.

The encoding standard is not limited to JPEG standard and MPEG standard.

Figure 7:
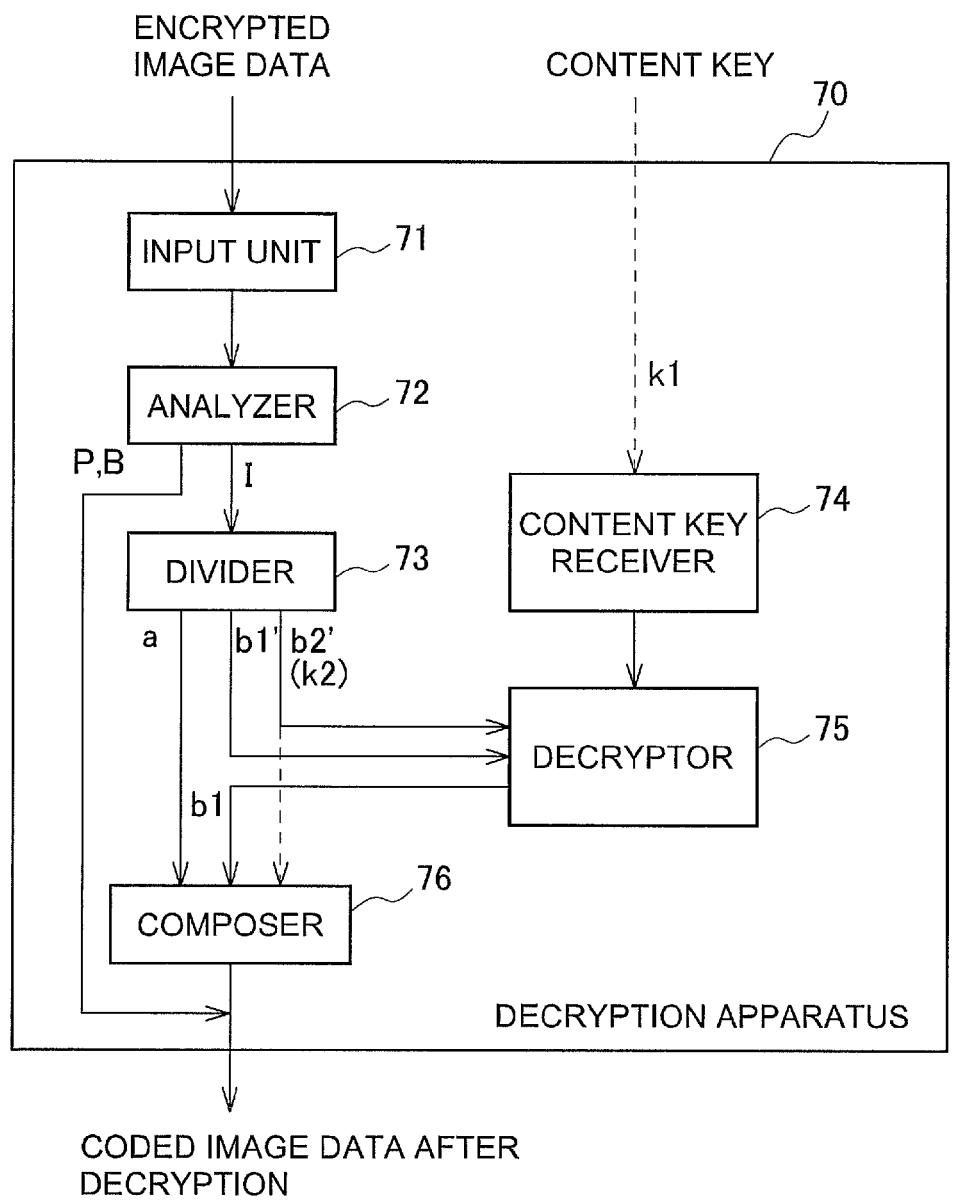
FIG. 7 is a functional block diagram showing decryption apparatus according to the first embodiment.

FIG. 7 is a functional block diagram showing a decryption apparatus for decrypting the encrypted data generated by the encryption apparatus 50.

Referring to FIG. 7, a decryption apparatus 70 includes an input unit 71, an analyzer 72, a divider 73, a content key receiver 74, a decryptor 75, and a composer 76. Among these components in the decryption apparatus 70, the analyzer 72 may be eliminated when only static image is input as encoded image data.

The input unit 71 receives the encrypted image data which was generated by the encryption apparatus 50. The received encrypted image data is the one encoded according to a predetermined format: still image data is encoded according to JPEG standard; and video data is encoded according to MPEG standard. In the input encrypted image data, a first portion of a second element is encrypted, and a first element a, the encrypted first portion b 1' of the second element, and the second portion b2' of the second element which was replaced with a frame key k2 corresponding to the image are composed.

When the encrypted data is video data encoded according to MPEG standard, as in the case of the encryption apparatus 50, an analyzer 72 is required in the decryption apparatus 70.

The analyzer 72 analyzes the image data to determine if the image data is I picture, P picture or B picture, using a sequence header in the sequence layer, a GOP header in the GOP layer, and a picture mode in the picture layer, and when determining that the image data is I picture, the analyzer 72 sends the encoded data to the divider 73. When determining that the image data is P picture or B picture, the analyzer 72 sends the encoded image data to the divider 73 as it is.

When only still image data is involved in as encoded image data, the analyzer 72 may be eliminated.

The divider 73 divides the encrypted data, after receipt from the input unit 71, into a first element a, a first portion b 1' of a second element, and a second portion b2' of the second element. For example, the encrypted data may be divided, in frequency space in ascending order of frequency, into a first element a, a first portion b 1' of a second element, and a second portion b2' of the second element. The divider 73 may be the same one as the divider 53 of the encryption apparatus 50. In the case of video data encoded according to MPEG standard, one image data consists of a group of data blocks having 8×8 bits, and the divider 73 carries out a dividing process for each block on the basis of frequency components or bits.

The content key receiver 74 functions to receive a content key k1 which corresponds to a plurality of still image data or video data comprising of one sequence, and receives a content key k1 input by a user, and sends it to the decryptor 75. The content key k1 is the one generated by the content key generator 54 of the encryption apparatus 50 to correspond to a plurality of still image data or video data comprising of one sequence, and may be the one transmitted by other communication unit.

The decryptor 75 receives the second portion b2' of the second element which was divided by the divider 73 as a frame key k2, and decrypts the first portion b 1' of the second element which was divided by the divider 73, using the content key k1 from the content key receiver 74 and the frame key k2 divided by the divider 73. In the decryption, the content key k1 received by the content key receiver 74 and the frame key k2 divided by the divider 73 are used to generate a key stream which is comprised of a random number sequence, and an XOR operation is performed with the key stream and the encrypted data, so that the encryption of the data which was encrypted in bits can be decrypted. The generation of the key stream and the decryption should be executed based on the algorithm common to that of the encryptor 56, and the algorithm used in the decryption may be configured in the same manner as that in the encryptor 56. When a block cipher such as DES and AES is used as an encryption algorithm, the algorithm is configured as a corresponding decryption unit. As described above, when DES is used, the algorithm can be configured to correspond to that for encryption with a 56-bit key length and a 64-bit block length; while the block cipher is AES, the algorithm can be configured to correspond to that for encryption with a 128-bit, 192-bit, or 256-bit key length, and a 128-bit block length.

The composer 76 composes the first element a divided by the divider 73 and the first portion b1 of the second element from which the encryption was decrypted by the decryptor 75, and outputs the composite data. At this point, in order to maintain the data length of the output encoded data constant, the second portion of the second element has to be simultaneously composed thereto, thereby the composer 76 may be configured to compose the second portion b2' of the second element which was divided by the divider 73. As described above, in the case of video data encoded according to MPEG standard, the data consists of a group of data blocks having 8×8 bits, and the composer 76 carries out a composite process by replacing the first element a, the first portion b1 of the second element after the decryption, and the second portion b2' of the second element, which is generated in blocks, with a new data block having 8×8 bits.

In the decryption apparatus 70, since the input encrypted data includes the frame key k2 replaced with the second portion b2' of the second element of the image data, the second key k2 divided in the divider 73 and the content key k1 transmitted using other communication unit are used to decrypt the data. Therefore, the use of different encryption keys for every image enables to overcome the vulnerability to known plaintext attacks, and also eliminates frequent updates of the encryption keys.

As for video data encoded according to MPEG standard, the data can be playbacked from any GOP because the frame key k2 is generated for every GOP.

Figure 8:
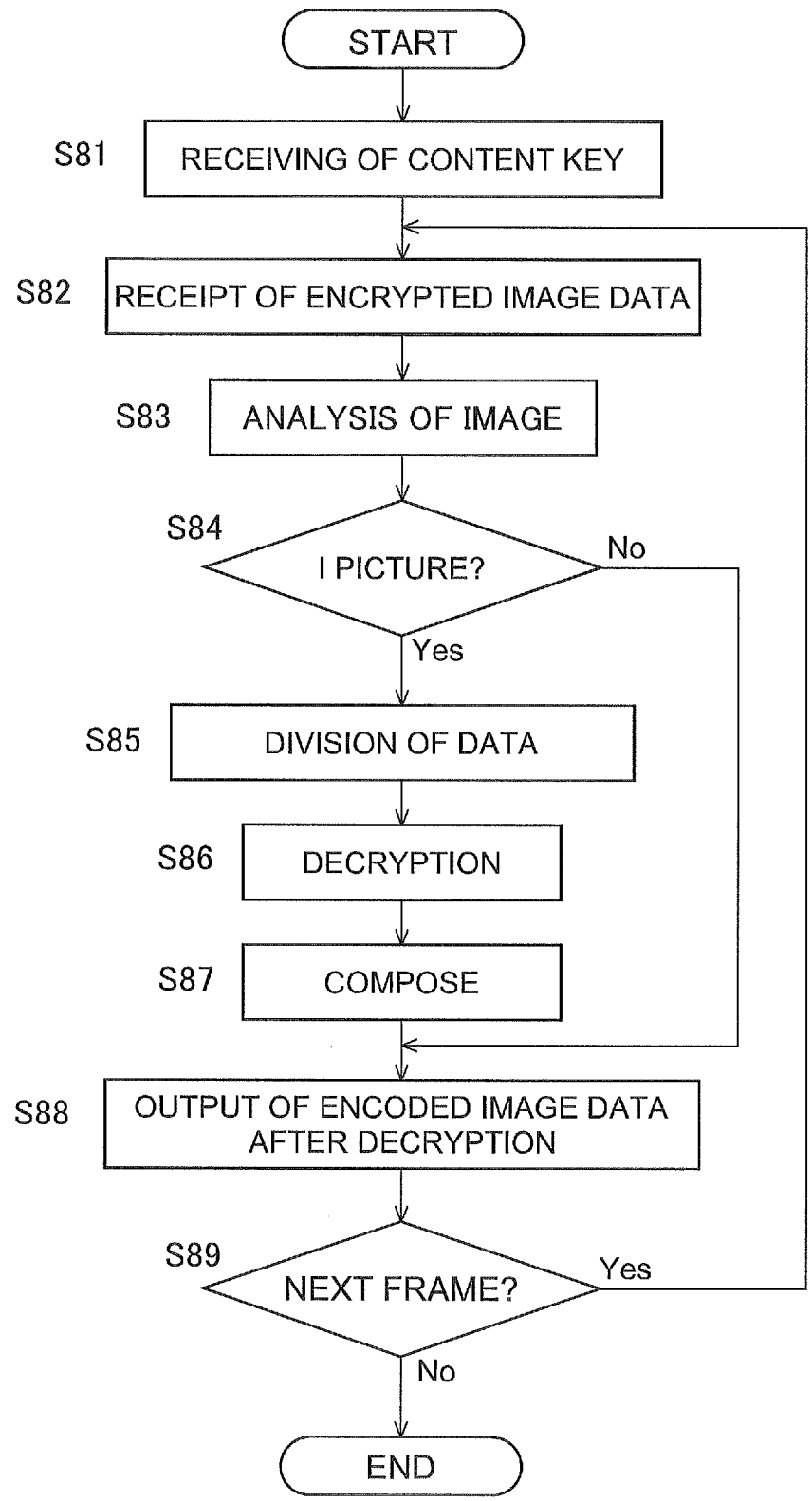
FIG. 8 is a flowchart showing a decryption process according to the first embodiment.

FIG. 8 is a flowchart showing a decryption process in the decryption apparatus 70.

Referring to FIG. 8, in Step S81, the content key receiver 74 receives a content key corresponding to a plurality of still image data or video data comprising of one sequence. The content key receiver 74 receives a content key which is input by a user, and transmits it to the decryptor 75.

In Step S82, the input unit 71 receives encrypted data. The received encrypted data is the one encoded according to a predetermined format, and in the input encrypted data, a first portion b1 of a second element is encrypted, and a first element a, an encrypted first portion b 1' of the second element, and a second portion b2' of the second element which was replaced with a frame key k2 corresponding to the image are composed.

In Step S83, the analyzer 72 analyzes the image data to determine if the image data is I picture, P picture or B picture, using a sequence header in the sequence layer, a GOP header in the GOP layer, and a picture mode in the picture layer. When only still image data is involved in as image data, Step S83 may be eliminated.

In Step S84, when the analyzer 72 determines that the image data is I picture, the process goes to Step S85, otherwise goes to Step S88. The analyzer 72 analyzes the image data to determine if the image data is I picture, P picture or B picture, using a sequence header in the sequence layer, a GOP header in the GOP layer, and a picture mode in the picture layer, and when determining that the image data is I picture, the analyzer 72 sends the encoded data to the divider 73, and then the process goes to Step S85. When the analyzer 72 determines that the encoded image data is P picture or B picture, the process goes to Step S88, and the encoded image data is sent as it is.

In Step S85, the divider 73 divides the encrypted data, after receipt from the input unit 71, into a first element a, a first portion b 1' of a second element, and a second portion b2' of the second element. For example, the encrypted data may be divided, in frequency space in ascending order of frequency, into a first element a, a first portion b1' of a second element, and a second portion b2' of the second element. The divider 73 may be the same of as the divider 53 of the encryption apparatus 50 for sharing. In the case of video data encoded according to MPEG standard, one image data consists of a group of data blocks having 8×8 bits, and the divider 73 carries out a dividing process for each block on the basis of frequency components or bits. The divider 73 inputs the divided first portion b1' of the second element and the frame key k2 replaced as the second portion b2' of the second element into the decryptor 75.

In Step S86, the decryptor 75 receives the second portion b2' of the second element which was divided by the divider 73 as a frame key k2, and decrypts the first portion b1' of the second element which was divided by the divider 73, using the content key k1 from the content key receiver 74 and the frame key k2 divided by the divider 73. In the decryption, the content key k1 received by the content key receiver 74 and the frame key k2 divided by the divider 73 are used to generate a key stream which is comprised of a random number sequence, and an XOR operation is performed with the key stream and the encrypted data, so that the encryption of the data which was encrypted in bits can be decrypted. The generation of the key stream and the decryption should be executed based on the algorithm common to that of the encryptor 56, and the algorithm used in the decryption may be configured in the same manner as that in the encryptor 56. When a block cipher such as DES and AES is used as an encryption algorithm, the algorithm is configured as a corresponding decryption unit. As described above, when DES is used, the algorithm can be configured to correspond to that for encryption with a 56-bit key length and a 64-bit block length; while the block cipher is AES, the algorithm can be configured to correspond to that for encryption with a 128-bit, 192-bit, or 256-bit key length, and a 128-bit block length.

In Step S87, the composer 76 composes the first element a divided by the divider 73 and the first portion b1 of the second element from which the encryption was decrypted by the decryptor 75, and outputs the composite data. At this point, in order to maintain the data length of the output encoded data constant, the second portion b2 of the second element has to be simultaneously composed thereto, thereby the composer 76 may be configured to compose the second portion b2' of the second element which was divided by the divider 73. As described above, in the case of video data encoded according to MPEG standard, the data consists of a group of data blocks having 8×8 bits, and the composer 76 carries out a composite process by replacing the first element a, the first portion b1 of the second element after the decryption, and the second portion b2' of the second element, which is generated in blocks, with a new data block having 8×8 bits.

In Step S88, the composer 76 outputs the encoded data after the decryption.

In Step S89, the input unit 71 determines if there is an input data or not, and if there is any data, the process goes to Step S82, otherwise the process ends.

When only still image data is involved in as encoded image data, Step S83 and Step S84 may be eliminated.

On the assumption that the encryption apparatus shown in FIG. 5 and the decryption apparatus shown in FIG. 7 are applied to video data encoded according to MPEG standard, a MPEG data hierarchy will be explained below.

Figure 9:
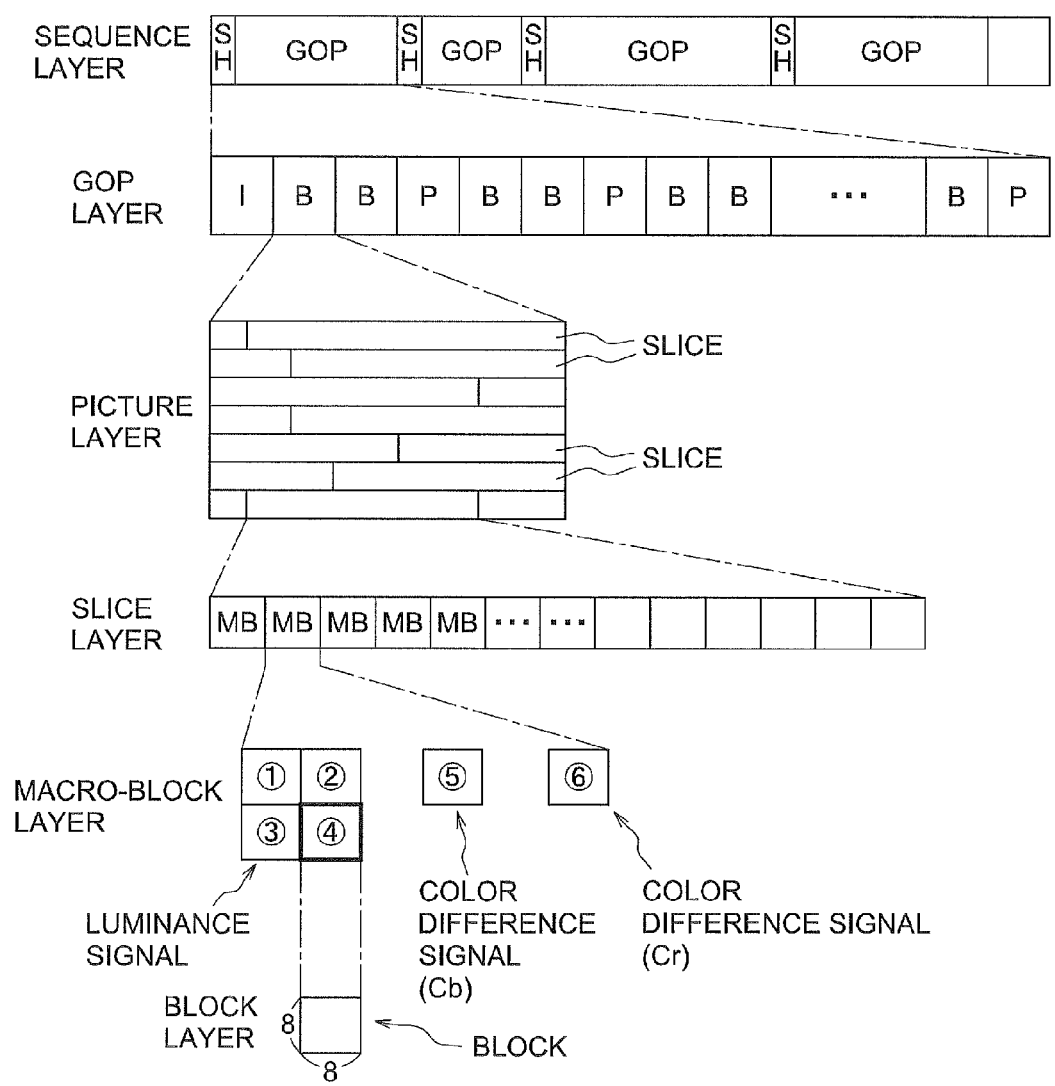
FIG. 9 is a diagram illustrating a data hierarchy of MPEG.

FIG. 9 is a diagram illustrating a data hierarchy encoded according to MPEG standard.

Referring to FIG. 9, the data encoded according to MPEG standard is configured with a sequence layer, GOP layer, a picture layer, a slice layer, a macro-block layer, and a block layer.

The sequence layer is configured with a series of picture groups which have same attributes, and includes a sequence header (SH: Sequence Header), GOP (Groupe Of Pictures). The GOP layer is configured with the minimum unit of picture groups as random access units, and includes intraframe encoded images (I picture), interframe forward directional prediction encoded images (P picture), and bidirectional prediction encoded image (B picture). The picture layer is configured with a group of slices which are small pictures of any length into which one piece of image is divided. The slice layer contains information common to small pictures of any length into which one piece of image is divided, and includes pixel blocks (MB: macro block) into which the slice layer is further divided. The macro-block layer contains information common to pixel blocks into which the slice layer is further divided, and includes a plurality of blocks. The block layer is composed of blocks which consists of 8×8 bits, and for example when a picture is encoded in a 4:2:0 format, four luminance signal (Y) blocks and two color difference (Cb and Cr) blocks are overlaid at the same position in the picture to form one block. When a picture is encoded in a 4:2:2 format as a MPEG encoding scheme, four luminance signal (Y) blocks and two of two color difference (Cb and Cr) blocks are overlaid to form one block. When a picture is encoded in a 4:4:4 format as a MPEG encoding scheme, four luminance signal (Y) blocks and four of four color difference (Cb and Cr) blocks are overlaid to form one block.

The above descried encryption process has to be performed on the basis of each block layer.

FIG. 10 is a diagram illustrating a structure of a block layer in MPEG-2. In addition, the column of REFERENCE TABLE of FIG. 10 shows the table number of ISO/IEC13818-2.

Referring to FIG. 10, as for the luminance signal (Y) blocks, the parameters are arranged from DCT_DC_size_Luminance, DCT_DC_differential, First DCT co-efficient, subsequent DCT coefficient, and END of Block in this order, and have code lengths of 2-9, 1-11, 2-24, 3-24, 2 or 4, respectively.

As for the color difference (Cb and Cr) block, the parameters are arranged from DCT_DC_size_chrominance, DCT_

DC_differential, First DCT coefficient, subsequent DCT coefficient, and END OF Block in this order, and have code lengths of 2-9, 1-11, 2-24, 3-24, 2 or 4, respectively.

Now, a procedure to reconstruct DCT coefficients (DCT_cof(i):i=0:DC component $1\leq i \leq 63$ components) will be described below:

1. Apply First DCT coefficient to the TABLE B. 14-16 of ISO/IEC 13818-2: 2000(E) to obtain a Run value and a Level value.
2. Set DCT_cof(0) equal to the LEVEL value.
3. Set the coefficient to be 0 the number of times of the RUN value (DCT_cof(i)=0 ($0\leq i \leq 63$).
4. Apply subsequent DCT coefficient to the TABLE B. 14-16 of ISO/IEC 13818-2: 2000(E) to obtain a Run value and a Level value.
5. Set DCT_cof(0) equal to the LEVEL value.
6. Set the coefficient to be 0 the number of times of the RUN value. (DCT_cof(i)=0(current+$1\leq i \leq$current+Run))
7. Repeat the procedure from 4 to 6 until End of Block.
8. Set the remained coefficients to be 0 (DCT_cof(i)=0 (current$\leq i \leq 63$))

In the DCT coefficients decoded in the above procedures, the ones with a smaller variable i have a lower frequency, while the ones with a larger variable i have a higher frequency. Thus, the division of the variables i within the range of $0\leq i \leq 63$ into three components provides the division of the DCT coefficients in ascending order of frequency.

As one example, the coefficients within the range of $0\leq i \leq 2$ are set to be a first frequency component, the coefficients within the range of $3\leq i \leq 32$ are set to be a second frequency component, and the coefficients within the range of $33\leq i \leq 63$ are set to be a second frequency component, so that the block of 8×8 bits can be divided into three frequency components in ascending order of frequency, and each component can be set to be a first element, a first portion of a second element, and a second portion of the second element, respectively. However, this is only one example to illustrate an approach to division of frequency components, and the present invention is not limited to this example, and the approach can be changed as needed. In addition, in order to adjust the recognizable degree of image data, the range of the variable i can be changed so that the visibility of the image data can be increased or decreased.

In this example, the explanation was made based on the data encoded according to MPEG-2, but the format is not limited to the MPEG-2, and image data may be configured to be divided into a first element and a second element on the basis of frequency components, and the second element may be further divided into a first portion and a second portion on the basis of frequency components.

In the first embodiment, the server 14 of FIG. 1 includes an encryption apparatus, but instead of the server 14, the encoder 12 may include an encryption apparatus. This enhances the security level of encoded image data transmitted from the encoder 12 to the server 14. Needless to say, both of the server 14 and the encoder 12 may individually include an encryption apparatus.

According to the first embodiment, in addition to a content key, a frame key is generated for at least every image of still image data or video data, which further enhances the security level. Moreover, a first portion of a second element of at least every image in encrypted data, that is a part of an image, is encrypted and a first element is not encrypted, thereby the content of the image can be roughly recognized when the encrypted data is decoded without decrypting, which enables editions of the encrypted data. Furthermore, a second portion of a second element of at least every image in encrypted data has a frame key embedded therein, as the result of that an authorized user, that is, a person who has a content key and has a device to take out a frame key can decrypt not only from the start point of the encrypted data but also in the middle of the data. Therefore, encrypted encoded still image data or video data having a higher security level and also easier handling is generated.

In the first embodiment, the second element has a frequency higher than that of the first element, and so the image which is decoded without decrypting will be more distinguishable in a half-visible state.

Second Embodiment

An image data distribution system according to a second embodiment of the present invention as the same structure as that shown in FIG. 1, which will not be explained below. An encryption apparatus according to the second embodiment of the present invention divides encoded image data which is the object of an encryption process on the basis of bits, and encrypts a part of the data. The encryption apparatus divides data which is transformed to a linear transformation coefficient by a linear transformation in an encoding process, into a first element, first portion of a second element, and a second portion of the second element on the basis of bits.

In MPEG-1, MPEG-2, and MPEG-4, discrete cosine transform (DCT) is used as a linear transformation. H.264 uses integer DCT; and JPEG 2000 uses discrete wavelet transformation.

Here, image data encoded according to MPEG standard will be explained as an example after DCT transformation.

Figure 11:
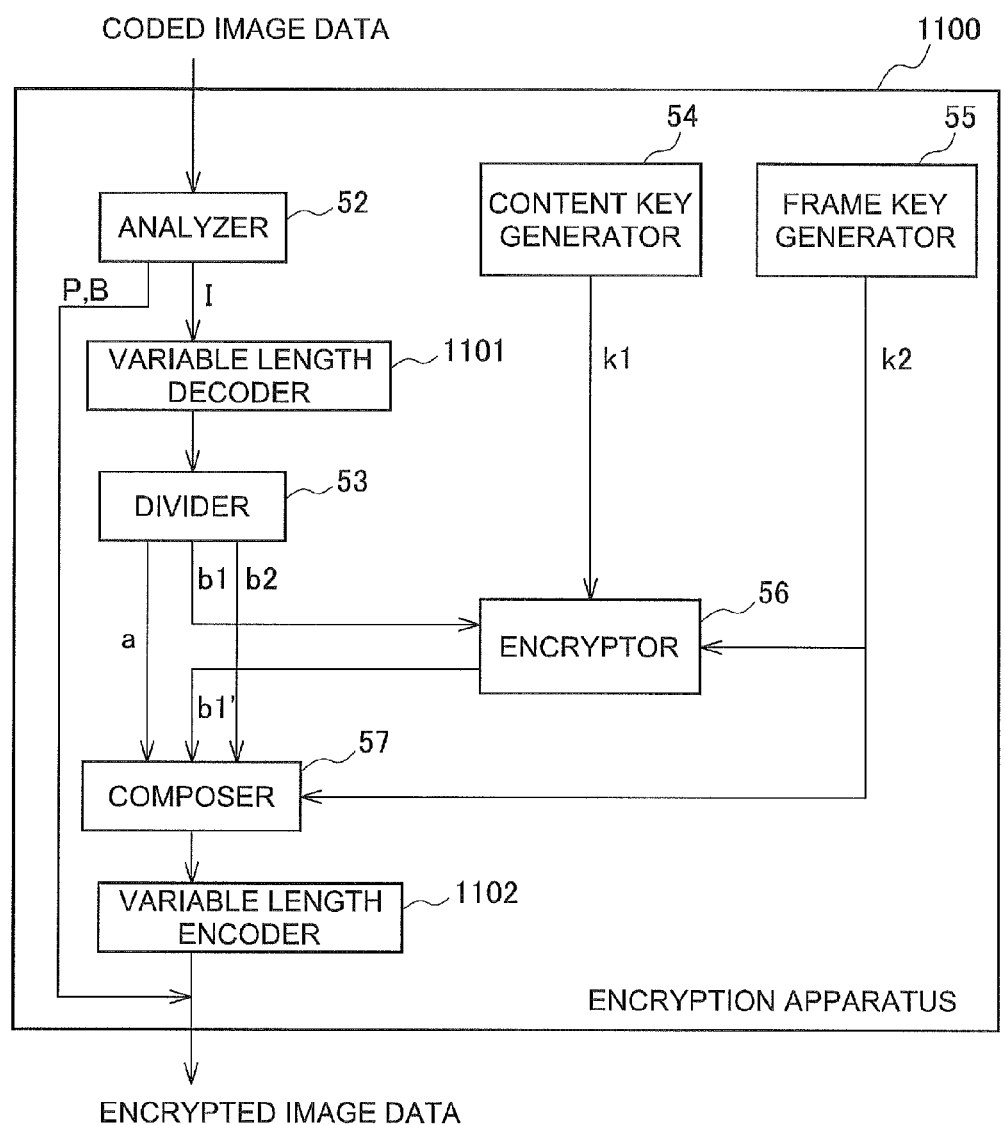
FIG. 11 is a functional block diagram showing an encryption apparatus of a second embodiment.

FIG. 11 is a functional block diagram showing an encryption apparatus of the second embodiment.

Referring to FIG. 11, an encryption apparatus 1100 includes an analyzer 52, a variable length decoder 1101, a divider 53, a content key generator 54, a frame key generator 55, an encryptor 56, a composer 57, and a variable length encoder 1102. When only still image data is input as encoded image data, the analyzer 52 may be eliminated from the encryption apparatus 1100.

The input data is image data encoded according to a predetermined format: still image data is encoded according to JPEG standard; and video data is encoded according to MPEG standard.

The analyzer 52 analyzes the input image data when the image data is encoded according to MPEG standards.

The video data encoded according to MPEG standard has a hierarchic structure including a sequence layer, a GOP (Group of Pictures) layer, a picture layer, a slice layer, a macro-block layer, and a block layer. The sequence layer is configured with a series of picture groups which have same attributes, and the GOP layer is configured with the minimum unit of picture groups as random access units. The GOP layer includes intraframe encoded images (Intra-Picture: I picture) which can be decoded independently from other pictures to reconstruct its image data, interframe forward directional prediction encoded images (Predictive-Picture: P picture), and bidirectional prediction encoded image (Bidirectionally Predictive-Picture: B picture). The slice layer contains information common to small pictures of any length into which one piece of picture is divided; the macro-block layer contains information common to pixel blocks into which the slice layer is further divided; and the block layer indicates a transformation coefficient itself.

The analyzer 52 analyzes image data to determine if the image data is I picture, P picture or B picture, using a sequence header in the sequence layer, a GOP header in the GOP layer, and a picture mode in the picture layer, and when the image data is I picture, the encoded data is sent to the divider 53. When the image data is P picture or B picture, the encoded image data is sent to the divider 53 as it is.

When only still image data is involved in as image data, the analyzer 52 may be eliminated.

The variable length decoder 1101 decodes the encoded image data comprised of DCT coefficients which are variable length encodes into fixed length encodes. In this case, the variable length decoder 1101 refers to Table B 14-16 of ISO/IEC 13818-2: 2000(E) and transforms the data into fixed length encodes of 8 bits.

The divider 53 divides encoded image data into a first element a and a second element b, and further divides the second element b into a first portion b1 and a second portion b2. For example, encoded image data may be divided, in frequency space in ascending order of frequency, into a first element a and a second element b, and the second element b may be further divided into first portion b1 and a second portion b2 in ascending order of frequency.

In the division, the second element b is configured with components having a frequency higher than that of the first element a, which are hard to visibly recognize in a displayed image. The second portion b2 of the second element b is configured with a number of components having a frequency higher than that of the first portion b 1, which are extremely hard to recognize. Preferably the second portion of the second element is configured with frequency components which are impossible to visibly recognize.

The content key generator 54 generates a content key k1 which corresponds to a plurality of still image data or video data for one sequence, and for example, can be configured with a random number generator that generates a random number having a predetermined number of bits.

The frame key generator 55 generates a frame key k2 which corresponds to each image of still image data or video data. Similar to the content key generator 54, the frame key generator 55 can be configured with a random number generator that generates a random number having a predetermined number of bits.

The encryptor 56 encrypts the first portion b1 of the second element which was divided by the divider 53, using the content key k1 generated by the content key generator 54 and the frame key k2 generated by the frame key generator 55. Specifically, the encryptor 56 uses the content key k1 and the frame key k2 to generate an encryption key for encryption, so that the encryptor 56 encrypts the first portion b1 of the second element using the encryption key. The algorithm used in the encryption may be stream cipher in which a key stream is generated to be used in an encryption in bits.

The stream cipher is an encryption algorithm, such as MUG1 and RC4, which achieves encryption for any length of bits using a small memory with small processing delay. The algorithms used in the encryption and the decryption may be configured in the same manner.

For example, the algorithm used in the decryption may be configured so that the content key k1 and the frame key k2 are used to irreversibly generate a random number sequence, and the random number sequence is used as a key stream to perform an XOR operation onto the first portion of the second element in bits so as to generate encrypted data.

Alternatively, the algorithm used in the encryption may be block cipher such as DES (Data Encryption Standard) and AES (Advanced Encryption Standard).

The block cipher is an algorithm to encrypt constant-length blocks of data, and includes Camellia, KASUMI, and MISTY, in addition to DES and AES, any of which can be used.

When the block cipher is DES, the algorithm can be configured for encryption with a 56-bit key length and a 64-bit block length; while the block cipher is AES, the algorithm can be configured for encryption with a 128-bit, 192-bit, or 256-bit key length, and a 128-bit block length.

The composer 57 discards the second portion b2 of the second element which was divided by the divider 53, and generates a frame key k2 to be replaced as a new second portion b2' of the second element, so as to compose the first element a which was divided by the divider 53, the first portion b2' of the second element which was encrypted by the encryptor 56, and the second portion b2' of the second element which was replaced with the frame key k2. As described above, in the case of video data encoded according to MPEG standard, the data consists of a group of data blocks having 8×8 bits, and the composer 57 carries out a composite process by replacing the first element a, the encrypted first portion b1' of the second element, and the second portion b2' of the second element replaced with the frame key k2, which is generated in blocks, with a new data block having 8×8 bits.

The variable length encoder 1102 reencodes the encrypted image data which was generated at the composer 57.

According to the encryption apparatus of the second embodiment, the linear trans-formation coefficients of encoded image data are divided on the basis of bits, and a part of the data is encrypted, thereby an encryption process can be set up in more detail.

Figure 12:
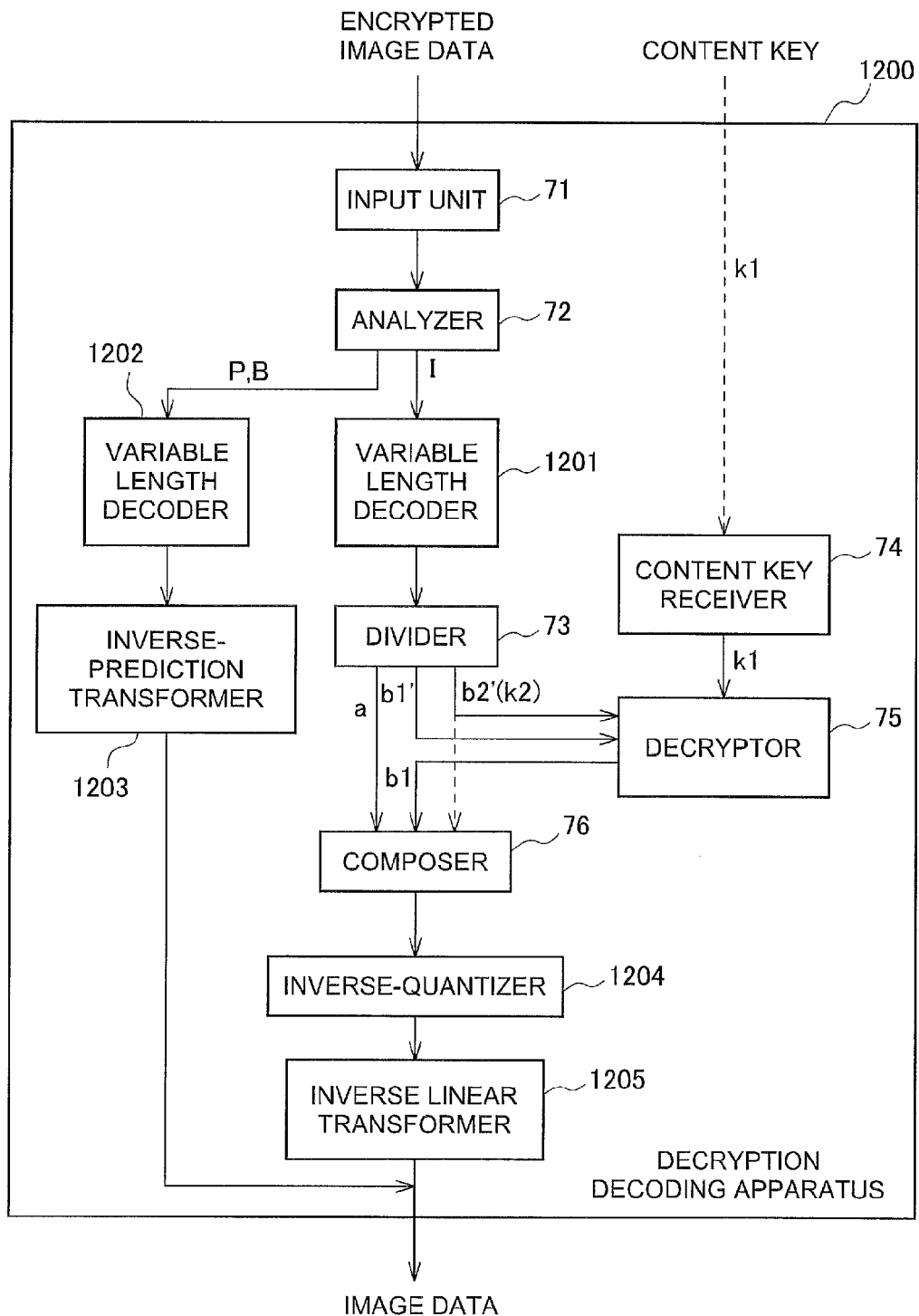
FIG. 12 is a functional block diagram showing a decryption decoding apparatus of the second embodiment.

FIG. 12 is a functional block diagram showing a decryption decoding apparatus of the second embodiment which performs decryption and decoding process.

Referring to FIG. 12, decryption decoding apparatus 1200 includes an input unit 71, an analyzer 72, a variable length decoder 1201, a divider 73, a content key receiver 74, a decryptor 75, a composer 76, a variable length decoder 1202, an inverse-prediction transformer 1203, an inverse-quantizer 1204, and an inverse linear transformer 1205.

The input unit 71 receives encrypted image data. The received encrypted image data is the one encoded according to a predetermined format: video data is encoded according to MPEG-1, MPEG-2, MPEG-4, MPEG4/AVC, H.261, H.262, H.263, H.264, VC-1, Canopus HQ Codec, DV CODEC, Motion JPEG, or Motion JPEG 2000, for example; and still image data is encoded according to JPEG, JPEG 2000, or HD Photo, for example. In the input encrypted image data, a first portion of a second element is encrypted, and a first element a, the encrypted first portion b 1' of the second element, and the second portion b2' of the second element which was replaced with a frame key k2 corresponding to the image are composed.

The analyzer 72 analyzes the image data to determine if the image data is I picture, P picture or B picture, using a sequence header in the sequence layer, a GOP header in the GOP layer, and a picture mode in the picture layer, and when determining that the image data is I picture, the analyzer 72 sends the encoded data to the first variable length decoder 1201. When determining that the image data is P picture or B picture, the analyzer 72 sends the encoded image data to the second variable length decoder 1202. One of the first variable length decoder 1201 and the second variable length decoder 1202 may be eliminated to share the remained one.

The first variable length decoder 1201 decodes the variable length encoded data to fixed length code. In this case, variable length decoder 1201 refers to Table B. 14-16 of ISO/IEC 13818-2: 2000(E) to transform the data to fixed length code of 8 bits.

The divider 73 divides the input encoded data into higher bits, middle bits, and lower bits to set the bits to be a first element a, a first portion b 1' of a second element, and a second portion b2' of the second element, respectively. For example, when the encoded data is input as a fixed-length data of 8 bits by the first variable length decoder 1201, the higher 4 bits is set to be a first element a, the middle 3 bits is set to be a first portion b1 of a second element, and the lower 1 bits is set to be a second portion b2 of the second element.

The content key receiver 74 functions to receive a content key k1 which corresponds to a plurality of still image data or video data comprising of one sequence, and accepts a content key k1 input by a user, and sends it to the decryptor 75. The content key k1 is the one generated to correspond to a plurality of still image data or video data comprising of one sequence, and may be the one transmitted by other communication unit.

The decryptor 75 receives the second portion b2' of the second element which was divided by the divider 73 as a frame key k2, and decrypts the first portion b 1' of the second element which was divided by the divider 73, using the content key k1 from the content key receiver 74 and the frame key k2 divided by the divider 73. In the decryption, the content key k1 received by the content key receiver 74 and the frame key k2 divided by the divider 73 are used to generate a key stream which is comprised of a random number sequence, and an XOR operation is performed with the key stream and the encrypted data, so that the encryption of the data which was encrypted in bits can be decrypted.

The composer 76 composes the first element a divided by the divider 73 and the first portion b1 of the second element from which the encryption was decrypted by the decryptor 75, and outputs the composite data. At this point, in order to maintain the data length of the output encoded data constant, the second portion of the second element has to be simultaneously composed thereto, thereby the composer 76 may be configured to compose the second portion b2' of the second element which was divided by the divider 73. As described above, in the case of video data encoded according to MPEG standard, the data consists of a group of data blocks having 8×8 bits, and the composer 76 carries out a composite process by replacing the first element a, the first portion b1 of the second element after the decryption, and the second portion b2' of the second element, which is generated in blocks, with a new data block having 8×8 bits.

The inverse-quantizer 1204 performs an inverse transformation process of a quantization process.

The inverse linear transformer 1205 performs an inverse linear transformation process, and for example, in the case of MPEG standard, carries out an inverse discrete cosine transformation (IDCT) process.

The P picture and B picture which were transformed into fixed length encodes through the variable length decoder 1202 are then subjected to an inverse-prediction transformation by the inverse-prediction transformer 1203 so that the image data is reconstructed. For example, as for P picture, the inverse-prediction transformer 1203 refers to the I picture or P picture in a forward direction of the time series to reconstruct the image data. As for B picture, the inverse-prediction transformer 1203 refers to the I picture and/or P picture in a forward/backward direction to reconstruct the image data.

The above described decryption decoding apparatus 1200 outputs the image data reconstructed by the decryption and decoding process.

According to the decryption decoding apparatus of second embodiment, encoded and encrypted data can be output as digital data after the encryption of the data is decrypted and the data is decoded. The frame key used in the decryption is replaced with the second portion of the second element of the image data, and the frame key is taken out by the divider, which enables the decryption and decoding of the data from any position of the data.

Next, a specific example of the encryption method of the second embodiment will be explained below.

Figure 13:
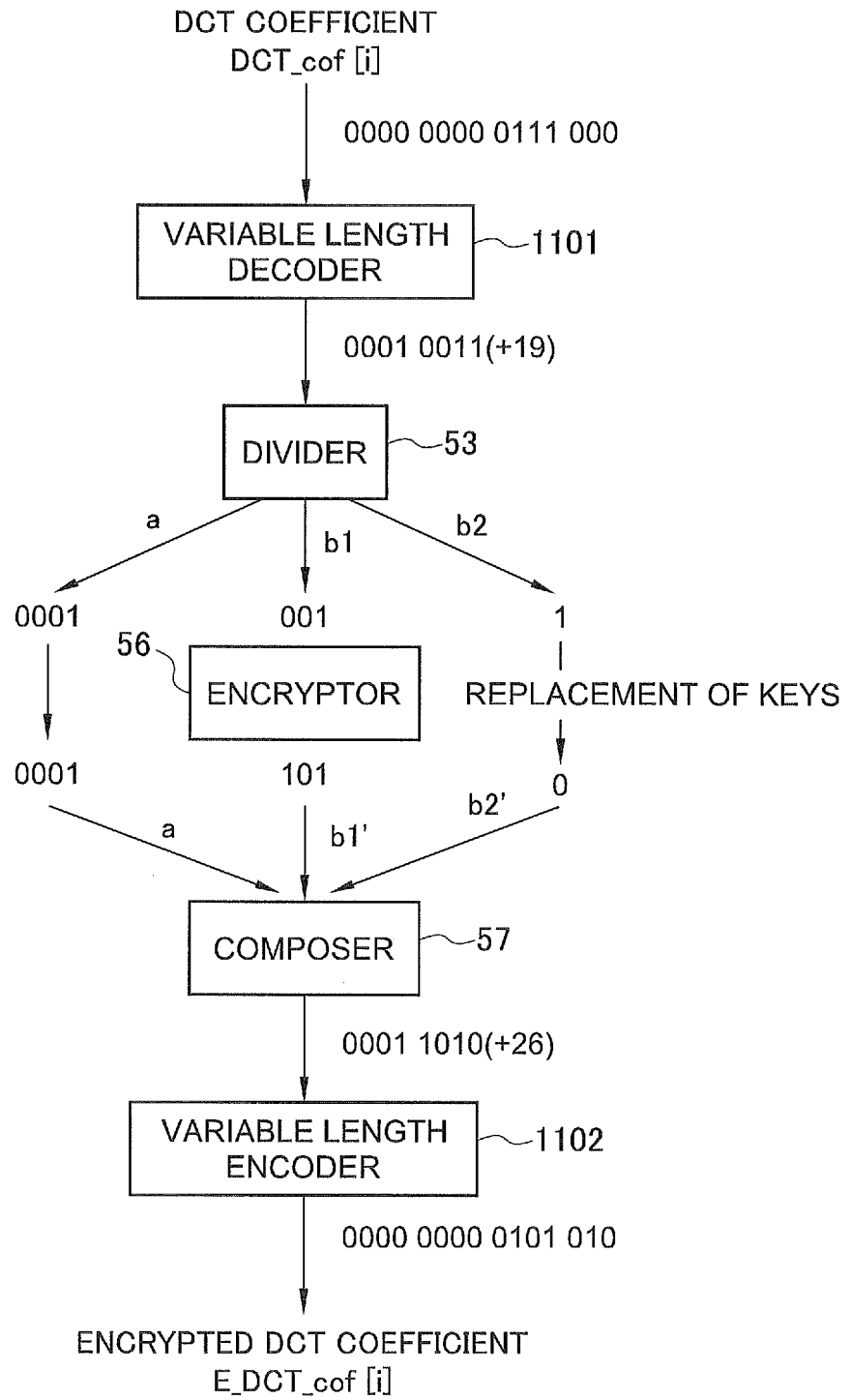
FIG. 13 is a flowchart showing an encryption method according to the second embodiment.

FIG. 13 is a diagram illustrating an encryption process in the second embodiment, in which a DCT coefficient is decoded to a fixed length code to be divided in bits.

Referring to FIG. 13, the variable length decoder 1101 decodes the input DCT coefficient DCT_cof(i) which is a variable length code. In this case, the DCT coefficient can be transformed into a fixed length code by referring to Table B. 14-16 of ISO/IEC 13818-2: 2000(E). In the shown example, Table B. 14 shows that the DCT_cof(i): "0000 0000 0111 000" corresponds to the values: RUN=0, LEVEL=19, that is (+19). When the DCT coefficient is transformed into a fixed length code of 8 bits for example, a code "0001 0011" can be obtained.

The fixed length code decoded by the variable length decoder 1101 is divided into three encodes in order from the higher bits by the divider 53. Here, higher 4 bits, middle 3 bits, and a lower 1 bit are divided, so that they are set to be a first element a, a first portion b1 of a second element, and a second portion b2 of the second element, respectively. In the shown example, the higher 4 bits of the first element a are transmitted to the composer 57 as they are. The middle 3 bits of the first portion b1 of the second element are subjected to an encryption process in the encryptor 56, so that the encrypted first portion b 1' of the second element is output in response to the result of the arithmetic processing with an encryption key. And the lower 1 bit of the second portion b2 of the second element is replaced with the frame key k2. In the shown example, the first element a divided by the divider 53 is input as a value "0001", and the encrypted first portion b1' of the second element is input as a value "101", and the second portion b2' of the second element replaced with the frame key k2 is input as a value "0" into the composer 57.

The first element a, the encrypted first portion b 1' of the second element, and the second portion b2 of the second element replaced with the frame key k2 are composed with each other in the composer 57. In the shown example, the value "0001" of the higher 4 bits of the first element, the value "101" of the middle 3 bits of the encrypted first portion b1' of the second element, and the value "0" of the lower 1 bit of the second portion b2' of the second element replaced with the frame key k2 are composed with each other in the composer 57, and the composite data is output as a fixed length code of 8 bits: "0001 1010".

The fixed length code output from the composer 57 is further subjected to an encoding process in the variable length encoder 1102. The variable length encoder 1102 transforms the code into a variable length code based on Table B. 14-16 of ISO/IEC 13818-2: 2000(E). In the shown example, Table B. 14 shows that the fixed length code: "0001 1010" corresponds to (+26), thereby the variable length encoder 1102 transforms the code into a variable length code "0000 0000 0101 010".

In this example also, the explanation was made based on the image data encoded according to MPEG-2, but the format is not limited to the MPEG-2, and encoded image data may be configured to be divided into a first element and a second element in bits, and the second element may be further divided into a first portion and a second portion in bits.

The above described dividing method in accordance with bit digits is intended to show one example, and the manner to divide the bit digits is not limited to the above described configuration. Also, in the decoding process to a fixed length code, the resulting fixed length code is not limited to the one of 8 bits.

In the second embodiment also, in addition to a content key, a frame key is generated for at least every image of still image data or video data for encryption, which further enhances the security level. Moreover, a first portion of a second element of at least every image in encrypted data, that is a part of an image, is encrypted and a first element is not encrypted, thereby the content of the image can be roughly recognized when the encrypted data is decoded without decrypting, which enables editions of the encrypted data. Furthermore, a second portion of a second element of at least every image in encrypted data has a frame key embedded therein, as the result of that an authorized user, that is, a person who has a content key and has a device to take out a frame key can decrypt not only from the start point of the encrypted data but also in the middle of the data. Therefore, encrypted encoded still image data or video data having a higher security level and also easier handling is generated.

In the second embodiment, the encoded still image data or video data is the one obtained by performing a linear transformation and quantization onto still image data or video data before encryption, and is a group of a predetermined bit number of data, in which the second element is comprised of lower bits than those of the first element. This makes the decoded image without decryption more distinguishable in a half-visible state.

Example of Image Encrypted in First Embodiment and Second Embodiment

An example of image of video data encrypted according to the encryption method of the present invention will be explained below.

Figure 14:
FIG. 14 is a diagram illustrating image data before an encryption process according to the present invention.

FIG. 14 shows an example of a picture in which one frame of video data encoded according to MPEG standard is displayed.

Figure 15:
FIG. 15 is a diagram illustrating image data after an encryption process on the basis of frequency according to the first embodiment.

FIG. 15 shows an example of picture in a case where the frame shown in FIG. 14 is displayed on a display apparatus after decoding without the decryption, with the image data of the frame being encrypted by the encryption apparatus according to the first embodiment.

In this example, as described above, a block of 8×8 bits is divided into three frequency components in ascending order of frequency, by dividing a DCT coefficients of a variable i within the range of $0<=i<=63$ into the coefficients within the range of $0<=i<=2$ as a first element a, the coefficients within the range of $3<=i<=32$ as a first portion b1 of a second element, and the coefficients within the range of $33<=i<=63$ as a second portion b2 of the second element. Among these, the first portion b1 of the second element is encrypted, and the first element a, the encrypted first portion b1' of the second element and the second portion b2' of the second element replaced with the frame key k2 are composed so as to make up an image, which is shown in FIG. 15.

Referring to FIG. 15, a user can recognize the image as the one having a woman wearing a hat, but cannot clearly check out the details of the image.

Figure 16:
FIG. 16 is a diagram illustrating image data after an encryption process on the basis of bits according to the second embodiment.

FIG. 16 shows an example of picture in a case where the frame shown in FIG. 14 is displayed on a display apparatus after decoding without the decryption, with the image data of the frame being encrypted by the encryption apparatus according to the second embodiment.

In this example, as described above, a variable length decoding is performed onto a fixed length code of 8 bits, and then the decoded code is divided into higher 4 bits, middle 3 bits, and a lower 1 bit, so that they are set to be a first element a, a first portion b1 of a second element, and a second portion b2 of the second element, respectively. Among these, the first portion b1 of the second element is encrypted, and the first element a, the encrypted first portion b 1' of the second element and the second portion b2' of the second element replaced with the frame key k2 are composed so as to make up an image, which is shown in FIG. 16.

Referring to FIG. 15, a user can recognize the image as the one having a woman wearing a hat, but cannot clearly check out the details of the image as in the case of FIG. 15.

In this way, in the present invention, a user can access to encrypted image data in its half-visible state after decoding of the encoded image data but without decryption, and can recognize the outline of the image data without decrypting. The visibility of the encrypted image data can be changed by changing the frequency range or the bit number of the non-encrypted first element and the encrypted first portion of the second element.

A frame key is generated for every GOP of video data encoded according to MPEG standard, and the frame key is replaced with a second portion of a second element of an intra encoded image (I picture) of the GOP which corresponds to the frame key, resulting in that the image can be playbacked from any GOP of the video data. Similarly, the frame key generated for each corresponding GOP is composed to a second portion of a second element in an intra encoded image of GOP, which enables editions of the image such as trimming and cutting without the decryption.

<Image Data Distribution System>

A procedure to transmit and receive various data between apparatuses in the image data distribution system shown in FIG. 1 will be explained below. For convenience of explanation, a server is alternately connected with one encoder and one STB.

Figure 17:
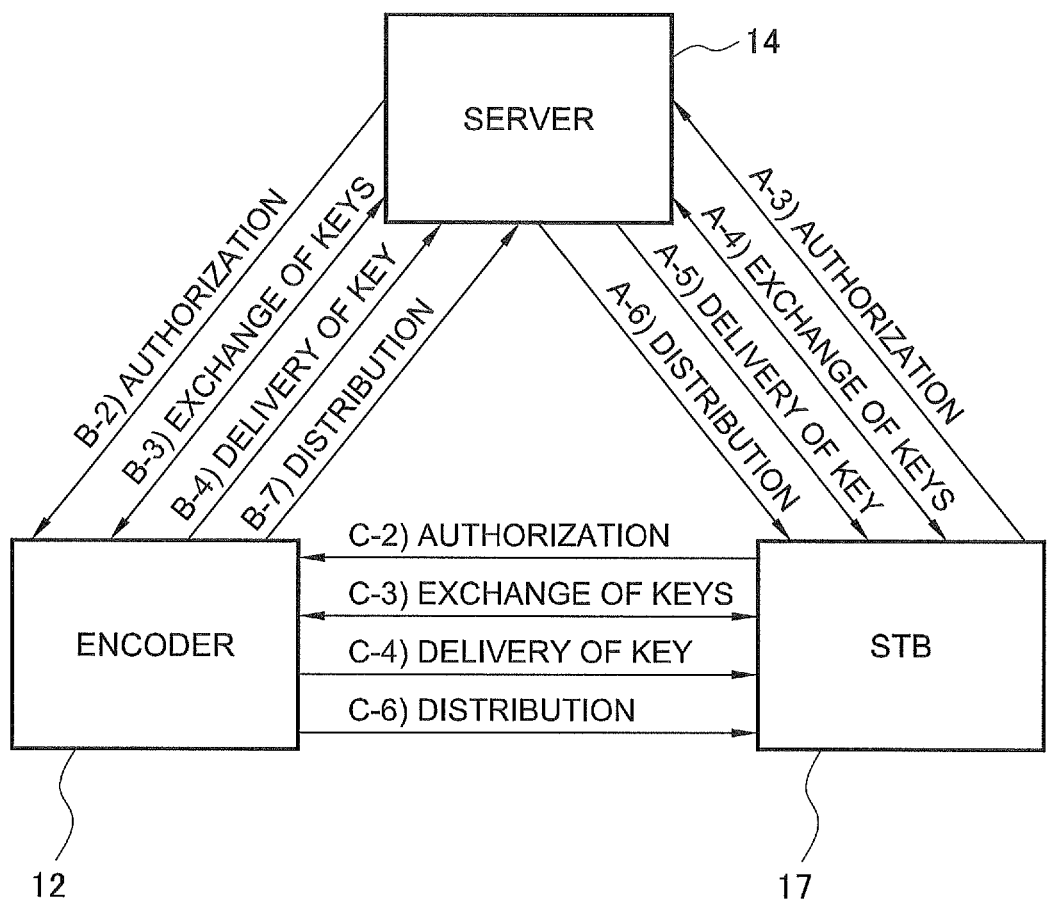
FIG. 17 is a diagram illustrating an example of an image data distribution system.

FIG. 17 is a diagram illustrating transmission and receiving of data between apparatuses in an image data distribution system.

Referring to FIG. 17, an encoder 12 for transmitting an video image from a camera as an encoded image data, a server 14 for storing the image data such as still image data and video data and distributing the data as needed to a connected terminal, and a set top box (STB) 17 connected to the server 14 and the encoder 12 to receive the distribution of the image data are alternately connected to each other.

A) Distribution of Content from Server to Set Top Box

When the content updated by the server 14 is distributed to the set top box 17, the following procedures are executed.

A-1) Update of Content

The server 14 is provided with a function to encrypt image data according to the encryption method of the present invention. The content to be distributed by the server 14 is subjected to an encryption process by the method of the present invention as described above. The encrypted content is stored in a predetermined region in a storage. Among the encryption keys used in the encryption, a content key is stored in the storage as a content key, and a frame key is composed with a second portion of a second element of each image as a frame key.

A-2) Entry of Password For Authentication

The server 14 enters a password for authentication to authorize the set top box 17. Specifically, the server 14 generates a password for authentication unique to the corresponding set top box 17, or receives a password transmitted from the set top box 17 side, and stores the password as a table with an identifier of the set top box 17 corresponding to the password.

A-3) Authentication of Password

The server 14 establishes a connection with the set top box 17, and receives a password transmitted from the set top box 17. The server 14 compares the received password with the password for authentication stored in the table in the storage, and if the two match, the sever 14 continues the process, and if not, suspends the process.

A-4) Exchange of Common Key for Distributing Content Key

The server 14 exchanges a common key for delivering a content key with the set top box 17 using a public key based key exchange system (for example, DH (Diffie-Hellman) key exchange).

A-5) Distribution of Content Key

The server 14 uses the common key for delivering a content key which the server 14 exchanged with the set top box 17 to encrypt the content key, and transmits the encrypted content key to the set top box 17.

A-6) Distribution of Encrypted Content

The server 14 distributes the encrypted content to the set top box 17.

A-7) Decryption of Encrypted Content

The set top box 17 decrypts the encrypted content transmitted from the server 14, and decodes it, so that an image of the content is displayed. In this procedure, the content key which is distributed in advance is decoded first, and separates the frame key which is composed with the second portion of the second element of the encrypted content, so that the content key and the frame key are used to decrypt the content.

B) Distribution of Content from Encoder to Server

The procedure for entering the content after the encryption process to the server 14 by the encoder 12 will be explained below.

B-1) Enter of Password for Authentication

The encoder 12 enters a password for authentication to authorize the server 14 to which the content is distributed. Specifically, the encoder 12 generates a password for authentication unique to the corresponding server 14, or receives a password transmitted from the server 14 side, and stores the password as a table with an identifier of the server 14 corresponding to the password.

B-2) Authentication of Password

The encoder 12 establishes a connection with the server 14, and receives a password transmitted from the server 14. The encoder 12 compares the received password with the password for authentication stored in the table in the storage, and if the two match, the sever 14 continues the process, and if not, suspends the process.

B-3) Exchange of Common Key for Delivering Content Key

The encoder 12 exchanges a common key for delivering a content key with the server 14 using a public key based key exchange system (for example, DH (Diffie-Hellman) key exchange).

B-4) Distribution of Content Key

The encoder 12 uses the common key for delivering a content key which the encoder 12 exchanged with the server 14 to encrypt the content key, and transmits the encrypted content key to the server 14.

B-5) Encryption of Content Key

The server 14 encrypts the content key transmitted from the encoder 12, and stores the encrypted content key in a predetermined region in the storage.

B-6) Encryption of Content

The encoder 12 uses the content key and the frame key generated for every frame to encrypt a first portion of a second element of the content, and generates an encrypted content in which a second portion of the second element is replaced with the frame key.

B-7) Distribution of Encrypted Content

The encoder 12 transmits the generated encrypted content to the server 14.

B-8) Entry of Encrypted Content

The server 14 stores the encrypted content transmitted from the encoder 12 in a predetermined region in the storage.

C) Distribution of Content from Encoder to Set top box

When the content is distributed from the encoder 12 to the set top box 17, the following procedures are executed.

C-1) Enter of Password for Authentication

The encoder 12 enters a password for authentication to authorize the set top box 17. Specifically, the encoder 12 generates a password for authentication unique to the corresponding set top box 17, or receives a password transmitted from the set top box 17 side, and stores the password as a table with an identifier of the set top box 1503 corresponding to the password.

C-2) Authentication of Password

The encoder 12 establishes a connection with the set top box 17, and receives a password transmitted from the set top box 17. The encoder 12 compares the received password with the password for authentication stored in the table in the storage, and if the two match, the sever 14 continues the process, and if not, suspends the process.

C-3) Exchange of Common Key for Delivering Content Key

The encoder 12 exchanges a common key for delivering a content key with the set top box 17 using a public key based key exchange system (for example, DH (Diffie-Hellman) key exchange).

C-4) Distribution of Content Key

The encoder 12 uses the common key for delivering a content key which the encoder 12 exchanged with the set top box 17 to encrypt the content key, and transmits the encrypted content key to the set top box 17.

C-5) Encryption of Content

The encoder 12 uses the content key and the frame key generated for every frame to encrypt the first portion of the second element of the content, and generates an encrypted content in which a second portion of the second element is replaced with the frame key.

C-6) Distribution of Encrypted Content

The encoder 12 transmits the generated encrypted content to the set top box 17.

C-7) Decryption of Encrypted Content

The set top box 17 decrypts the encrypted content transmitted from the encoder 12, and decodes it, so that an image of the content is displayed. In this procedure, the content key which is distributed in advance is decoded first, and separates the frame key which is composed with the second portion of the second element of the encrypted content, so that the content key and the frame key are used to decrypt the content.

Such an image data distribution system according to the present invention may be configured so that an image data captured by a camera is encoded by the encoder 12 and is transmitted to the server 14, where the image data is subjected to an encryption process to be stored, and is distributed in response to a transmission demand which is sent through the set top box 17.

It is also possible in the image data distribution system to encode an image data captured by a camera using the encoder 12 and perform an encryption process on the image data, so that the image data is distributed to the set-up box 17 in real time.

Because the distributed image data is encrypted using a content key as well as a frame key which is generated for at least every image of still image data or video data, which further enhances the security level. Moreover, a first portion of a second element of at least every image in encrypted data, that is a part of an image, is encrypted and a first element is not encrypted, thereby the content of the image can be roughly recognized when the encrypted data is decoded without decrypting, which enables editions of the encrypted data. Furthermore, a second portion of a second element of at least every image in encrypted data has a frame key embedded therein, as the result of that an authorized user, that is, a person who has a content key and has a device to take out a frame key can decrypt not only from the start point of the encrypted data but also in the middle of the data. Therefore, encrypted encoded still image data or video data having a higher security level and also easier handling is generated.

Third Embodiment

An image data distribution system according to a third embodiment of the present invention has the same structure as that shown in FIG. 1, which will not be explained in detail below. Also, an image data distribution apparatus according to a third embodiment of the present invention includes components most which are identical to those of the encryption apparatus shown in FIG. 5 and FIG. 7 decryption apparatus.

Figure 18:
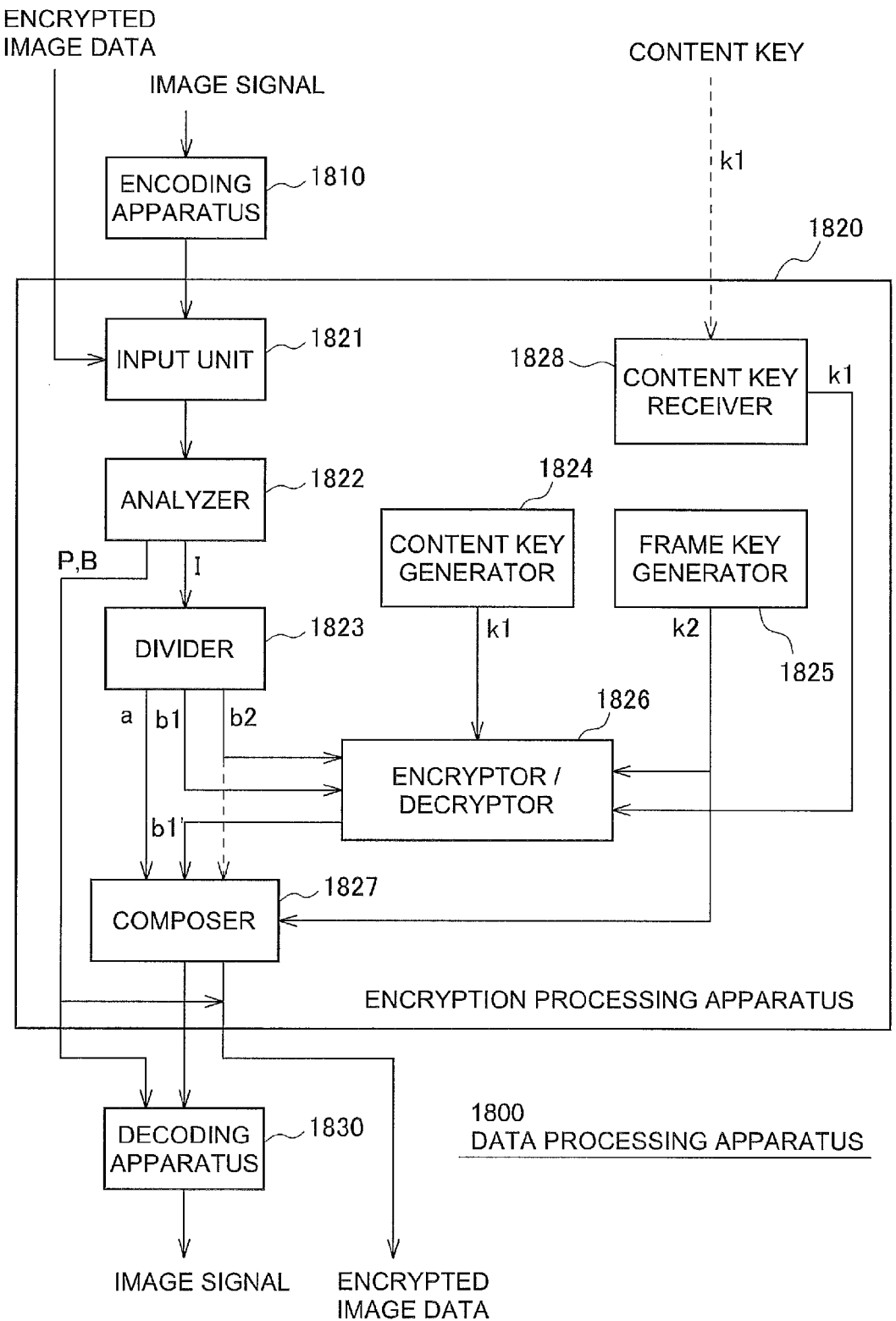
FIG. 18 is a functional block diagram showing a data processing apparatus according to a third embodiment.

FIG. 18 is a functional block diagram showing a data processing apparatus according to the third embodiment of the present invention.

Referring to FIG. 18, a data processing apparatus 1800 includes an encoding apparatus 1810, an encryption processing apparatus 1820, and decoding apparatus 1830.

The encoding apparatus 1810 performs an encoding process onto image data to be input according to a predetermined format, and for example, may be configured to perform a compression encoding process according to JPEG standard onto still image data, and to perform a compression encoding according to MPEG standard onto video data. The encoding apparatus 1810 may be configured to include an analog-digital transformer which performs a digital transformation on analog image data to generate digital image data when analog image data is input from analogy TV tuner or analog video device.

The encryption processing apparatus 1820 includes an input unit 1821, an analyzer 1822, a divider 1823, a content key generator 1824, a frame key generator 1825, an encryptor/decryptor 1826, a composer 1827, and a content key receiver 1828.

The input unit 1821 receives encoded still image data or video data which are input from the encoder 1810, and encrypted image data which are input from the outside. In the encrypted image data from the outside, as described above, a first portion of a second element is encrypted, and a second portion of the second element is replaced with a frame key corresponding to the image in the encoded still image data or video data.

When the data input to the input unit 1821 is the video data encoded MPEG standard, the data is transmitted to the analyzer 1822.

The analyzer 1822 analyzes the encoded data or encrypted data to determine if the image data is I picture, P picture or B picture, using a sequence header in the sequence layer, a GOP header in the GOP layer, and a picture mode in the picture layer, and when determining that the image data is I picture, the analyzer 1822 sends the encoded data or encrypted data to the divider 1823. When determining that the encoded data or encrypted data is P picture or B picture, the analyzer 1822 sends the data as it is.

The divider 1823 divides the encoded image data or encrypted image data into a first element a, a first portion b1 of a second element, and a second portion b2 of the second element. For example, the divider 1823 performs a linear transformation on the data, and divides the data into a first element a, a first portion b1 of a second element, and a second portion b2 of the second element in ascending order of frequency.

The content key generator 1824 generates a content key k1 which corresponds to a plurality of still image data or video data comprising of one sequence, and for example, can be configured with a random number generator that generates a random number having a predetermined number of bits.

The frame key generator 1825 generates a frame key k2 which corresponds to each image of still image data or video data. Similar to the content key generator 1824, the frame key generator 1825 can be configured with a random number generator that generates a random number having a predetermined number of bits.

The content key receiver 1828 receives a content key which corresponds to a plurality of still image data or video data comprising of one sequence, and accepts a content key input by a user and sends it to the encryptor/decryptor 1826. The content key is the one generated to correspond to a plurality of still image data or video data comprising of one sequence, and may be the one transmitted by other communication unit.

The encryptor/decryptor 1826 uses the content key k1 generated by the content key generator 1824 and the frame key k2 generated by the frame key generator 1825 to encrypt the first portion b1 of the second element which was divided by the divider 1823. The encryptor/decryptor 1826 uses the content key k1 and the frame key k2 to generate an encryption key which is used in encryption, and uses the encryption key to encrypt the first portion b1 of the second element. The algorithm used in the encryption may be stream cipher in which a key stream is generated to be used in an encryption in bits. For example, the algorithm used in the decryption may be configured so that the content key k1 and the frame key k2 are used to irreversibly generate a random number sequence, and the random number sequence is used as a key stream to perform an XOR operation onto the first portion of the second element in bits so as to generate encrypted data. Alternatively, the algorithm used in the encryption may be block cipher such as DES and AES. When the block cipher is DES, the algorithm can be configured for encryption with a 56-bit key length and a 64-bit block length; while the block cipher is AES, the algorithm can be configured for encryption with a 128-bit, 192-bit, or 256-bit key length, and a 128-bit block length.

The encryptor/decryptor 1826 accepts the second portion b2 of the second element which was divided by the divider 1823 as a frame key k2, and uses the content key k1 from the content key receiver 1828 and the frame key k2 from the divider 1823 to decrypt the first portion b1 of the second element which was divided by the divider 1823.

The encryptor/decryptor 1826 may be configured, in decrypting, to use the content key k1 received at the content key receiver 1828 and the frame key k2 divided in the divider 1823 to generate a key stream which is comprised of a random number sequence, and perform an XOR operation with the key stream and the encrypted data, so that the encryption of the data which was encrypted in bits can be decrypted. And when block cipher such as DES and AES is used as an algorithm for encryption, the encryptor/decryptor 1826 may be configured as corresponding decrypting unit. As described above, the encryptor/decryptor 1826 is configured to correspond to the encryption with a 56-bit key length and a 64-bit block length when DES is used, and to the encryption with a 128-bit, 192-bit, or 256-bit key length, and a 128-bit block length when AES is used.

With respect to the encoded image data, the composer 1827 discards the second portion of the second element which was divided by the divider 1823, and generates a frame key k2 to be replaced as a new second portion of the second element, so as to compose the first element a which was divided by the divider 1823, the first portion of the second element which was encrypted by the encryptor 1826, and the second portion of the second element which was replaced with the frame key k2.

And with respect to the encrypted image data, the composer 1827 composes the first element divided by the divider 1823 and the first portion of the second element the encryption of which was decrypted by the encryptor/decryptor 1826 for output. At this point, in order to maintain the data length of the output encoded data constant, the second portion of the second element has to be simultaneously composed thereto, thereby the composer 1827 may be configured to compose the second portion (frame key k2) of the second element which was divided by the divider 1823.

The decoding apparatus 1830 decodes the encoded still image data or video data which is output from the encryption processing apparatus 1820. The decoding apparatus 1830 decodes the encoded data which was decrypted by the encryption processing apparatus 1820 and outputs the image signal of the still image data or video data.

The encrypted image data which was subjected to an encryption process by the encryption processing apparatus 1820 is output without passing through the decoder 1830, and for example, can be distributed using communication unit (not shown) via network.

According to the third embodiment, because still image data or video data is encrypted using a content key as well as a frame key which is generated for at least every image of the data, which further enhances the security level. Moreover, a first portion of a second element of at least every image in encrypted data, that is a part of an image, is encrypted and a first element is not encrypted, thereby the content of the image can be roughly recognized when the encrypted data is decoded without decrypting, which enables editions of the encrypted data. Furthermore, a second portion of a second element of at least every image in encrypted data has a frame key embedded therein, as the result of that an authorized user, that is, a person who has a content key and has a device to take out a frame key can decrypt not only from the start point of the encrypted data but also in the middle of the data. Therefore, encrypted encoded still image data or video data having a higher security level and also easier handling is generated.

Also, according to the third embodiment, the structures of an encryption apparatus and a decryption apparatus can be achieved in one apparatus structure, thereby the apparatus is able to function as a source apparatus relative to the image data receiving side.

Fourth Embodiment

An image data distribution system according to a fourth embodiment of the present invention has the same structure as that shown in FIG. 1, which will not be explained in detail below. An encryption encoding apparatus according to the fourth embodiment of the present invention performs an encoding process and an encryption based on the data division in bits as described in the above second embodiment in the case where image data which is not subjected to an encoding process is input to the input unit thereof.

Figure 19:
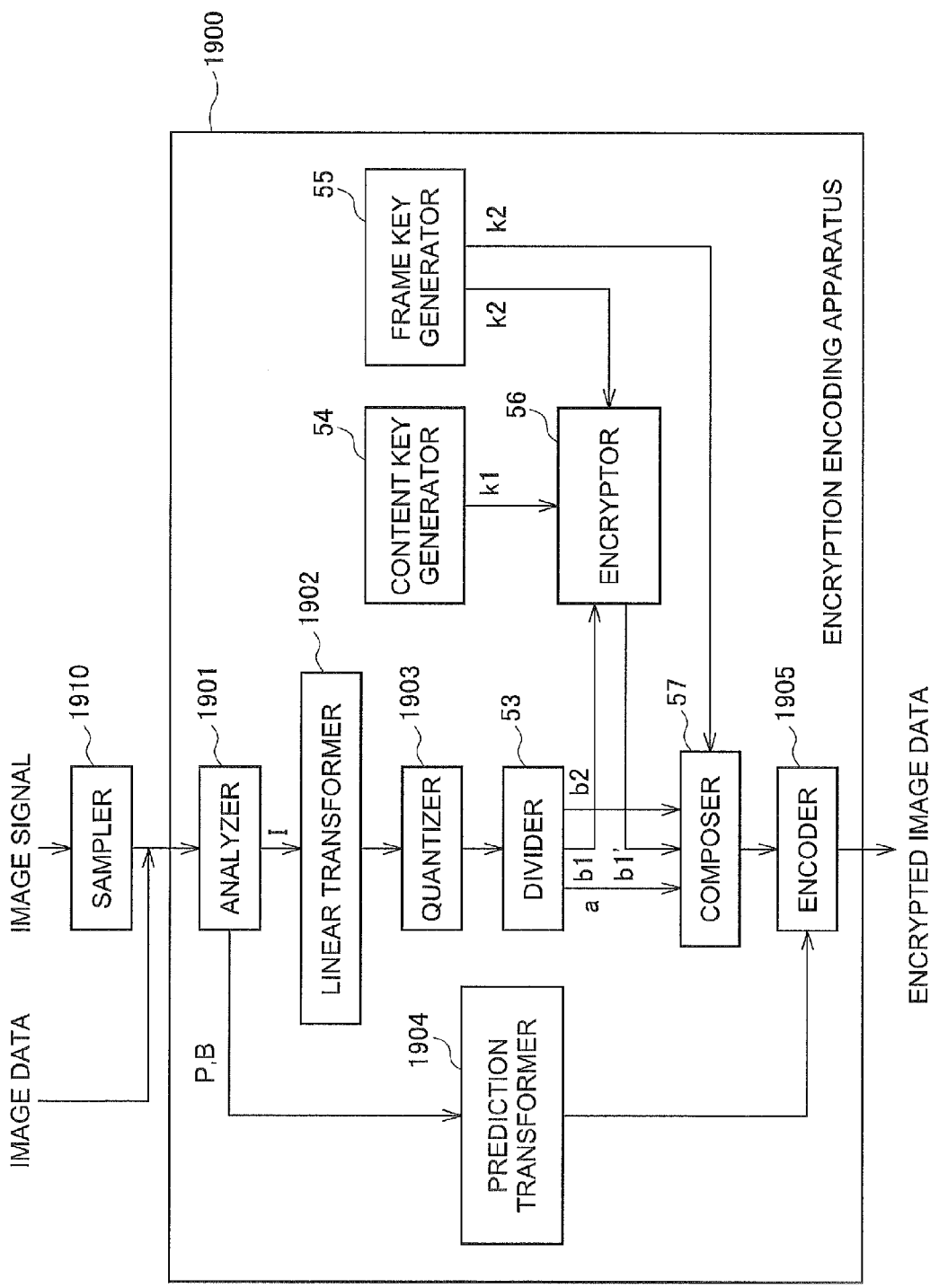
FIG. 19 is a functional block diagram showing an encryption encoding apparatus according to a fourth embodiment.

FIG. 19 is a functional block diagram showing an encryption encoding apparatus according to a fourth embodiment of the present invention.

Referring to FIG. 19, the encryption encoding apparatus 1900 includes an analyzer 1901, a linear transformer 1902, a quantizer 1903, a divider 53, a content key generator 54, a frame key generator 55, an encryptor 56, a composer 57, a prediction transformer 1904, and an encoder 1905.

When the image data input to the encryption encoding apparatus 1900 is analogue data, the encryption encoding apparatus 1900 may be configured to further include a sampling apparatus 1910.

The sampler 1910 samples the input analogue data by a predetermined sampling frequency to transform it into digital data.

The analyzer 1901 determines if an input image is to be an intra encoded image or a prediction encoded image, and when the image is to be an intra encoded image, the analyzer 1901 transmits a corresponding image data to the linear transformer 1902, and when the image is to be a prediction encoded image, the analyzer 1901 transmits a corresponding image data to the prediction transformer 1904.

The linear transformer 1902 performs a linear transformation onto the transmitted image data to calculate a linear transformation coefficient. For example, for MPEG-1, MPEG-2, MPEG-4, discrete cosine transform (DCT) is used as a linear transformation. And integer DCT is used for H.264, while discrete wavelet transformat is used for JPEG 2000.

The quantizer 1902 quantifies the linear transformation coefficient which was calculated in the linear transformer 1902 to output as a fixed length code.

The divider 53 divides the quantified linear transformation coefficient into a first element, a first portion of a second element, and a second portion of the second element. In a case with the quantified linear transformation coefficients of a variable i within the range of $0<=i<=63$ in ascending order of frequency, the coefficients within the range of $0<=i<=2$ can be set to be a first frequency component, the coefficients within the range of $3<=i<=32$ can be set to be a second frequency component, and the coefficients within the range of $33<=i<=63$ can be set to be a third frequency component. And these components can be set to be a first element a, a first portion b1 of a second element, a second portion b2 of the second element, respectively in ascending order of frequency.

When the divider 53 is configured to divide a fixed length code on the basis of bits, the divider 53 may divide the linear transformation coefficient quantified by the quantizer 1902 into higher bits, middle bits, and lower bits to set the bits to be a first element a, a first portion b1 of a second element, and a second portion b2 of the second element, respectively. For example, as in the above described case, when the quantified DCT coefficient has a data length of 8 bits, the coefficient can be divided so that the higher 4 bits are set to be a first element a, the middle 3 bits are set to be a first portion b1 of a second element, and the lower 1 bit is set to be a second portion b2 of the second element.

The content key generator 54 generates a content key k1 which corresponds to a plurality of still image data or video data comprising of one sequence, and for example, can be configured with a random number generator that generates a random number having a predetermined number of bits.

The frame key generator 55 generates a frame key k2 which corresponds to each image of still image data or video data. Similar to the content key generator 54, the frame key generator 55 can be configured with a random number generator that generates a random number having a predetermined number of bits.

The encryptor 56 uses the content key k1 generated in the content key generator 54 and the frame key k2 generated in the frame key generator 55 to encrypt the first portion b1 of the second element divided in the divider 53. Specifically, the encryptor 56 uses the content key k1 and the frame key k2 to generate an encryption key for encryption, so that the encryptor 56 encrypts the first portion b1 of the second element using the encryption key. The algorithm used in the encryption may be stream cipher in which a key stream is generated to be used in an encryption in bits.

The composer 57 discards the second portion b2 of the second element which was divided by the divider 53, and generates a frame key k2 to be replaced as a new second portion b2' of the second element, so as to compose the first element a which was divided by the divider 53, the first portion b1' of the second element which was encrypted by the encryptor 56, and the second portion b2' of the second element which was replaced with the frame key k2. As described above, in the case of video data encoded according to MPEG standard, the data consists of a group of data blocks having 8×8 bits, and the composer 57 carries out a composite process by replacing the first element a, the encrypted first portion b1' of the second element, and the second portion b2' of the second element replaced with the frame key k2, which is generated in blocks, with a new data block having 8×8 bits.

In the prediction transformer 1904, when the image data is P picture, a prediction transformation is computed based on the previous I picture or P picture in time series, and when the image data is B picture, a prediction transformation is computed based on the previous or next I picture and/or P picture in time series.

The encoder 1905 performs an encoding process onto image data which is transmitted thereto, and achieves a compression encoding by a variable length encoding process.

The encrypt image data generated by the encryption encoding apparatus according to the fourth embodiment can be subjected to a decryption by the decryption apparatus 70 according to the first embodiment shown in FIG. 7 or the decryption decoding apparatus according to the second embodiment shown in FIG. 12.

According to the fourth embodiment, still image data or video data is encrypted using a content key as well as a frame key which is generated for at least every image of the data, which further enhances the security level. Moreover, a first portion of a second element of at least every image in encrypted data, that is a part of an image, is encrypted and a first element is not encrypted, thereby the content of the image can be roughly recognized when the encrypted data is decoded without decrypting, which enables editions of the encrypted data. Furthermore, a second portion of a second element of at least every image in encrypted data has a frame key embedded therein, as the result of that an authorized user, that is, a person who has a content key and has a device to take out a frame key can decrypt not only from the start point of the encrypted data but also in the middle of the data. Therefore, encrypted encoded still image data or video data having a higher security level and also easier handling is generated.

According to the fourth embodiment, the apparatus can be configured to, even when image data is input without encoding, encode the image data using MPEG standard such as MPEG-1, MPEG-2, MPEG-4, and MPEG4/AVC, the standard such as H.261, H.262, H.263, H.264, VC-1, Canopus HQ Codec, DV CODEC, Motion JPEG, and Motion JPEG 2000 which divides an image into blocks and compress video image using linear transformation on the basis of blocks, JPEG standard such as JPEG and JPEG 2000, and the standard such as HD Photo which uses linear transformation for every block to compress static image, and also performs an encryption process on the image data.

While only selected embodiments have been chosen to illustrate the present invention, it will be apparent to those skilled in the art from this disclosure that various changes and modifications can be made herein without departing from the scope of the invention defined in depended claims. Furthermore, the detailed descriptions of the embodiments according to the present invention provided for illustration only, and not for the purpose of limiting the invention as defined by the present claims and specifications.

DESCRIPTION OF SYMBOLS 50 encryption apparatus
53 divider
54 content key generator
55 frame key generator
56 encryptor
57 composer
70 decryption apparatus
73 divider
74 content key receiver
75 decryptor
76 composer

The invention claimed is:

1. An encryption apparatus, comprising:
a processor; and
a memory storing instructions which when executed by the processor:
  divides encoded still image data or video data into a first element and a second element;
  generates a first key;
  generates a second key for at least every one image of the still image data or video data;
  encrypts a first portion of the second element of the image using the first key and the second key corresponding to the at least one image;
  replaces a second portion of the second element of the at least one image other than the first portion with the second key corresponding to the image; and
  composes the first element of the image, the encrypted first portion of the second element and the second key for at least every one image to generate an encrypted data.

2. The encryption apparatus according to claim 1, wherein the second element has a frequency higher than a frequency of the first element.

3. The encryption apparatus according to claim 2, wherein the second portion has a frequency higher than a frequency of the first portion.

4. The encryption apparatus according to claim 1, wherein:
the encoded still image data or video data is obtained by performing linear transformation and then quantization to still image data or video data before encoding, the encoded still image or video data being a group of a predetermined number of bits, and
the second element contains lower bits of the encoded still image or video data and the first element contains higher bits of the encoded still image or video data.

5. The encryption apparatus according to claim 4, wherein the second portion contains lower bits of the second portion of the encoded still image or video data and the first portion contains higher bits of the second portion of the encoded still image or video data.

6. The encryption apparatus according to claim 1, wherein the encoded video data is the one obtained by performing a variable length decoding to the data encoded according to MPEG standard, the encoded video data being a group of a predetermined number of bits, and the second element contains lower bits of the encoded video data and the first element contains higher bits of the encoded video data.

7. The encryption apparatus according to claim 6, wherein the second portion contains lower bits of the second portion of the encoded video data and the first portion contains higher bits of the second portion of the encoded video data.

8. An encryption apparatus, comprising:
a processor;
a memory storing instructions for execution by the processor;
a divider for dividing encoded still image data or video data into a first element and a second element;
a first generator for generating a first key;
a second generator for generating a second key for at least every one image of the still image data or video data;
an encryptor for encrypting a first portion of the second element of the image using the first key and the second key corresponding to the at least one image; and
a composer for replacing a second portion of the second element of the at least one image other than the first portion with the second key corresponding to the image; and for composing the first element of the image, the encrypted first portion of the second element and the second key for at least every one image to generate an encrypted data.

9. The encryption apparatus according to claim 8, wherein the second element has a frequency higher than a frequency of the first element.

10. The encryption apparatus according to claim 9, wherein in the second portion has a frequency higher than a frequency of the first portion.

11. The encryption apparatus according to claim 8, wherein
the encoded still image data or video data is obtained by performing linear transformation and then quantization to still image data or video data before encoding, the encoded still image or video data being a group of a predetermined number of bits, and
the second element contains lower bits of the encoded still image or video data and the first element contains higher bits of the encoded still image or video data.

12. The encryption apparatus according to claim 11, wherein
the second portion contains lower bits of the second portion of the encoded still image or video data and the first portion contains higher bits of the second portion of the encoded still image or video data.

13. The encryption apparatus according to claim 8, wherein
the encoded video data is the one obtained by performing a variable length decoding to the data encoded according to MPEG standard, the encoded video data being a group of a predetermined number of bits, and
the second element contains lower bits of the encoded video data and the first element contains higher bits of the encoded video data.

14. The encryption apparatus according to claim 13, wherein
the second portion contains lower bits of the second portion of the encoded video data and the first portion contains higher bits of the second portion of the encoded video data.

15. An encryption method, comprising the steps of:
dividing encoded still image data or video data into a first element and a second element;
generating a first key;
generating a second key for at least every one image of the still image data or video data;
encrypting a first portion of a second element of the image with the first key and the second key corresponding to the at least one image;
replacing a second portion of the second element of the at least one image other than the first portion with the second key corresponding to the image; and
composing the first element, the encrypted first portion of the second element, and the second key of the image, for at least every one image to generate encrypted data.

16. An image data distribution system, comprising an image data distributing apparatus and an image data receiving apparatus:
the image data distributing apparatus;
dividing encoded still image data or video data into a first element and a second element,
encrypting the first portion of the second element with a first key and a second key corresponding to at least one image,
replacing the second portion of the second element of the at least one image other than the first portion with a second key corresponding to the image, and
composing the first element, the encrypted first portion of the second element, and the second key of the image for at least every one image; and
the image data receiving apparatus;
receiving the encrypted data distributed by the data distributing apparatus, dividing each of the encrypted data into a first element and a second element,
obtaining a second key corresponding to at least one image from the second portion of the second element,
decrypting the first portion of the second element using the first key and the second key, and
composing the first element and the second element after the decryption for output.

* * * * *